(12) United States Patent
Ohwada et al.

(10) Patent No.: US 7,528,539 B2
(45) Date of Patent: May 5, 2009

(54) ELECTRON EMITTER AND METHOD OF FABRICATING ELECTRON EMITTER

(75) Inventors: Iwao Ohwada, Nagoya (JP); Kei Sato, Tokai (JP); Nobuyuki Kobayashi, Nagoya (JP); Shohei Yokoyama, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 229 days.

(21) Appl. No.: 11/145,004

(22) Filed: Jun. 2, 2005

(65) Prior Publication Data

US 2005/0269929 A1    Dec. 8, 2005

Related U.S. Application Data

(63) Continuation-in-part of application No. 10/877,517, filed on Jun. 25, 2004, now abandoned.

(60) Provisional application No. 60/640,169, filed on Dec. 27, 2004.

(30) Foreign Application Priority Data

Jun. 8, 2004  (JP) ............................. 2004-169997
Jun. 30, 2004 (JP) ............................. 2004-194472

(51) Int. Cl.
    *H01J 1/46*    (2006.01)
(52) U.S. Cl. ..................... 313/497; 313/495; 313/311
(58) Field of Classification Search .......... 313/495–497
    See application file for complete search history.

(56) References Cited

U.S. PATENT DOCUMENTS

| | | | |
|---|---|---|---|
| 5,280,221 A | 1/1994 | Okamoto et al. | |
| 5,453,661 A | 9/1995 | Auciello et al. | |
| 5,508,590 A | 4/1996 | Sampayan et al. | |
| 5,747,926 A | 5/1998 | Nakamoto et al. | |
| 5,874,802 A | 2/1999 | Choi et al. | |
| 6,157,145 A | 12/2000 | Vollkommer et al. | |
| 6,198,225 B1 | 3/2001 | Kano et al. | |

(Continued)

FOREIGN PATENT DOCUMENTS

JP    03-122938    5/1991

(Continued)

OTHER PUBLICATIONS

U.S. Appl. No. 10/719,521, filed Nov. 21, 2003, Takeuchi et al.

*Primary Examiner*—Sikha Roy
*Assistant Examiner*—Christopher M Raabe
(74) *Attorney, Agent, or Firm*—Burr & Brown

(57) ABSTRACT

An electron emitter includes an emitter layer formed of a dielectric material, an upper electrode, and a lower electrode. A drive voltage is applied between the upper electrode and the lower electrode, for emitting electrons. The upper electrode is formed of scale-like conductive particles on the upper surface of the emitter layer and has a plurality of opening portions. The surfaces of overhanging portions of the opening portions that face the emitter layer are apart from the emitter layer. The overhanging portions each have such a cross-sectional shape as to be acutely pointed toward the inner edge of the opening portion, or the tip end of the overhanging portion, so that lines of electric force concentrate at the inner edge.

17 Claims, 14 Drawing Sheets

U.S. PATENT DOCUMENTS

| | | | |
|---|---|---|---|
| 6,452,328 B1 * | 9/2002 | Saito et al. | 313/495 |
| 6,479,924 B1 | 11/2002 | Yoo | |
| 6,897,620 B1 | 5/2005 | Takeuchi et al. | |
| 6,960,876 B2 * | 11/2005 | Kuo et al. | 313/495 |
| 7,071,628 B2 * | 7/2006 | Takeuchi et al. | 315/169.1 |
| 7,176,609 B2 | 2/2007 | Takeuchi et al. | |
| 2002/0153827 A1 | 10/2002 | Takeuchi et al. | |
| 2002/0167021 A1 * | 11/2002 | Chen et al. | 257/163 |
| 2004/0061431 A1 | 4/2004 | Takeuchi et al. | |
| 2004/0066133 A1 | 4/2004 | Takeuchi et al. | |
| 2004/0090398 A1 | 5/2004 | Takeuchi et al. | |
| 2004/0100200 A1 | 5/2004 | Takeuchi et al. | |
| 2004/0104684 A1 | 6/2004 | Takeuchi et al. | |
| 2004/0104689 A1 | 6/2004 | Takeuchi et al. | |
| 2004/0104690 A1 | 6/2004 | Takeuchi et al. | |
| 2004/0113561 A1 | 6/2004 | Takeuchi et al. | |
| 2004/0233136 A1 | 11/2004 | Takeuchi et al. | |
| 2004/0256995 A1 | 12/2004 | Takeuchi et al. | |
| 2005/0062390 A1 | 3/2005 | Takeuchi et al. | |

FOREIGN PATENT DOCUMENTS

| | | | |
|---|---|---|---|
| JP | 03-225721 | | 10/1991 |
| JP | 05-325777 | | 12/1993 |
| JP | 09-045216 | | 2/1997 |
| JP | 09-090882 | | 4/1997 |
| JP | 09-090882 A | | 4/1997 |
| JP | 11260249 A | * | 9/1999 |
| JP | 2000-512070 | | 9/2000 |
| JP | 2001-035354 | | 2/2001 |
| JP | 3214256 | | 7/2001 |
| JP | 2001-283714 | | 10/2001 |

* cited by examiner

ELECTRON EMITTER AND METHOD OF FABRICATING ELECTRON EMITTER

CROSS REFERENCE TO RELATED APPLICATIONS

This application is a continuation-in-part of U.S. Application Ser. No. 10/877,517, filed Jun. 25, 2004 now abandoned, and also claims the benefit under 35 USC § 119(e) of U.S. Provisional Application Serial No. 60/640,169, filed Dec. 27, 2004, the entireties of which are incorporated herein by reference.

This application claims the benefit of Japanese Application No. 2004-169997, filed Jun. 8, 2004, and Japanese Application No. 2004-194472, filed Jun. 30, 2004, the entireties of which are incorporated herein by reference.

BACKGROUND OF THE INVENTION

1. Field of the Invention

The present invention relates to an electron emitter applicable to electron beam sources for use in various devices and apparatus that utilize electron beam, such as field emission displays (FEDs), backlight units, electron beam irradiation apparatus, light sources, electronic parts manufacturing apparatus, and electronic circuit components, as well as to a method of fabricating the same.

2. Description of the Related Art

As is generally known, the above-mentioned electron emitter is operated in a vacuum having a predetermined vacuum level, and configured such that a predetermined electric field is applied to an electron emitter (hereinafter called an emitter), whereby electrons are emitted from the emitter. In application to an FED, a plurality of electron emitters are two-dimensionally arrayed, and a plurality of phosphors corresponding to the electron emitters are arrayed with a predetermined spacing held therebetween. Among the two-dimensionally arrayed electron emitters, certain electron emitters are selectively driven so as to emit electrons therefrom. The emitted electrons collide with phosphors corresponding to the driven electron emitters. The phosphors hit by the electrons fluoresce, thereby displaying a desired image.

Specific examples of the electron emitter are disclosed in, for example, Japanese Patent Application Laid-Open (kokai) Nos. H01-311533, H07-147131, and 2000-285801 and Japanese Patent Publication (kokoku) Nos. S46-20944 and S44-26125. In the disclosed electron emitters, fine conductive electrodes are used as emitters. Since micromachining that involves etching, forming, or the like is required for forming such fine conductive electrodes, a fabrication process becomes complicated. Since high voltage must be applied for emitting electrons, ICs for high-voltage drive and like components must be used, resulting in increased component costs. Thus, the disclosed electron emitters involve a problem of high fabrication costs and an associated increase in fabrication costs for apparatus to which the electron emitters are applied.

In order to cope with the problem, an electron emitter in which an emitter is formed of a dielectric material is devised and disclosed in, for example, Japanese Patent Application Laid-Open (kokai) Nos. 2004-146365 and 2004-172087. General findings regarding electron emission in the case where a dielectric material is used to form an emitter are disclosed in, for example, Yasuoka and Ishii, "Pulsed Electron Source Using a Ferroelectric Cathode," Applied Physics, Vol. 68, No. 5, p. 546-550 (1999); V. F. Puchkarev, G. A. Mesyats, "On the Mechanism of Emission from the Ferroelectric Ceramic Cathode," J. Appl. Phys., Vol. 78, No. 9, 1 Nov., 1995, p. 5633-5637; and H. Riege, "Electron Emission Ferroelectrics—a Review," Nucl. Instr. and Meth. A340, p. 80-89 (1994).

The electron emitters disclosed in Japanese Patent Application Laid-Open (kokai) Nos. 2004-146365 and 2004-172087 (hereinafter called merely "conventional electron emitters") are configured such that a cathode electrode covers a portion of the upper surface of an emitter formed of a dielectric material while a grounded anode electrode is disposed on the lower surface of the emitter or on the upper surface of the emitter with a predetermined spacing maintained between the same and the cathode electrode. Specifically, the electron emitters are configured such that an exposed region of the upper surface of the emitter at which neither the cathode electrode nor the anode electrode is formed is present in the vicinity of a peripheral edge portion of the cathode electrode. At the first stage, voltage is applied between the cathode electrode and the anode electrode such that the cathode electrode is higher in electric potential. An electric field induced by the applied voltage brings the emitter (particularly the exposed portion) into a predetermined polarization. At the second stage, voltage is applied between the cathode electrode and the anode electrode such that the cathode electrode is lower in electric potential. At this time, primary electrons are emitted from the peripheral edge portion of the cathode electrode, and the polarization of the emitter is inverted. The primary electrons collide with the exposed portion of the polarization-inverted emitter, whereby secondary electrons are emitted from the emitter. An externally applied, predetermined electric field causes the secondary electrons to fly in a predetermined direction; i.e., the electron emitter emits electrons.

In the conventional electron emitters, in emission of electrons from the cathode electrode toward the emitter, emission of electrons occurs at a site on the surface of the cathode electrode where concentration of lines of electric force causes high electric field intensity at that site (an increase in electric field intensity at a portion of the surface of an electrode, or a conductor, as a result of concentration of lines of electric force at the portion is hereinafter called merely "electric field concentration," and a site where "electric field concentration" occurs is hereinafter called merely "electric field concentration point").

FIG. 18 schematically shows an example of a conventional electron emitter. In a conventional electron emitter 200, an upper electrode 204 is formed on the upper surface of an emitter 202, and a lower electrode 206 is formed on the lower surface of the emitter 202. The upper electrode 204 is in close contact with the emitter 202. In this case, only a peripheral edge portion of the upper electrode 204 is an electric field concentration point. The peripheral edge portion of the upper electrode 204 is a so-called triple junction, where the upper electrode 204, the emitter 202, and a vacuum contact.

However, since a peripheral edge portion of the upper electrode 204 is in close contact with the emitter 202, an electric field concentration point, which serves as an electron-emitting site, is limited to a peripheral edge portion of the upper electrode 204. Thus, the number of electron-emitting sites is limited. As a result, an increase in electron emission quantity is limited, since a drive voltage can be increased only to such a degree that dielectric breakdown of the emitter 202 does not occur.

SUMMARY OF THE INVENTION

The present invention has been accomplished in view of the above problem, and an object of the present invention is to provide an electron emitter having enhanced electron emission quantity, as well as a method of fabricating the electron emitter.

To achieve the above object, an electron emitter according to the present invention comprises an emitter layer formed of a dielectric material; a first electrode provided on or above a first surface of the emitter layer and having an opening portion with an opening formed therein; and a second electrode provided on or above a second surface of the emitter layer opposite the first surface. The electron emitter is configured such that the emitter layer emits electrons through the opening when a drive voltage is applied between the first electrode and the second electrode. In the electron emitter, the first electrode is configured and disposed such that a surface of the opening portion facing the first surface of the emitter layer is apart from the first surface, and the opening portion has an inner edge surrounding the opening, and has a shape which causes lines of electric force to concentrate at the inner edge.

The above-mentioned shape of the opening portion that causes lines of electric force to concentrate at the inner edge of the opening portion can be implemented by, for example, any of the following means: the cross section of the opening portion has a sharp profiled inner wall surface; a convexity is formed on the inner wall surface of the opening portion; and conductive fine particles each having a size substantially equal to or smaller than the thickness of the first electrode are caused to adhere to the opening portion. The above-mentioned shape of the opening portion can also be implemented by imparting a hyperboloidal profile (particularly the hyperboloidal profile such that the cross section of the opening portion has a pointed upper end and a pointed lower end at the inner edge of the opening portion) to the inner wall surface of the opening portion. Furthermore, the above-mentioned shape of the opening portion that causes lines of electric force to concentrate at the inner edge of the opening portion can be implemented in various other forms.

According to the above-mentioned configuration of the present invention, since the opening portion of the first electrode is apart from the first surface of the emitter layer, a gap is formed between the first surface and a surface of the opening portion of the first electrode facing the first surface. As compared with the case where no gap is formed, the formation of the gap lowers the capacitance of a virtual capacitor that is formed between the first surface of the emitter layer and the surface of the opening portion of the first electrode facing the first surface. Accordingly, most of the drive voltage is substantially applied to the gap portion, whereby electric field intensity of the opening portion, or a peripheral edge portion, of the first electrode increases as compared with the case of the above-mentioned conventional electron emitters in which no gap is formed.

According to the above-mentioned configuration of the present invention, the opening portion of the first electrode is apart from the first surface of the emitter layer, whereby a gap is formed between the first surface and a surface of the opening portion of the first electrode facing the first surface, and the cross section of the opening portion of the first electrode assumes the form of an overhanging portion (flange). Additionally, the opening portion has a shape which causes lines of electric force to concentrate at the inner edge thereof. Accordingly, in the opening portion, a triple junction, which serves as an electric field concentration point, arises at a position different from the inner edge of the opening portion, and an electric field concentration point also arises on the inner edge of the opening portion. Thus, the number of electron-emitting sites can be increased.

Thus, according to the above-mentioned configuration of the present invention, enhanced electric field intensity is provided at the electric field concentration points; the number of electric field concentration points can be increased; and enhanced electric field concentration can be readily generated. Accordingly, an electron emitter having enhanced electron emission quantity can be provided.

Preferably, the electron emitter of the present invention is operated as follows: at the first stage, a drive voltage is applied such that the first electrode becomes lower in electric potential than the emitter layer, whereby electrons are emitted (supplied) from the first electrode toward the emitter layer; i.e., electrons are accumulated on the emitter layer (the emitter layer is charged); and at the second stage, a drive voltage is applied such that the first electrode becomes higher in electric potential than the emitter layer, whereby accumulated electrons are emitted from a surface of the emitter layer. Such operation can be performed, for example, in the following manner.

A drive voltage to be applied between the first electrode and the second electrode is, for example, a voltage that is applied in the form of a pulse voltage or alternating-current voltage with respect to a predetermined reference electric-potential (for example, 0 V).

At the first stage, a drive voltage is applied between the first electrode and the second electrode such that the electric potential of the first electrode is lower than the reference electric-potential, whereas the electric potential of the second electrode is higher than the reference electric-potential. By so doing, an electric field induced by the drive voltage causes the emitter layer to be polarized such that positive charges appear in the first surface of the emitter layer, and electric field concentration arises at the above-mentioned electric field concentration point. Accordingly, electrons are supplied from the first electrode toward the emitter layer. As a result, electrons are accumulated at a portion of the first surface of the emitter layer corresponding to the opening portion of the first electrode, through attraction by the positive charges appearing in the surface of the portion. In other words, the portion of the first surface of the emitter layer that corresponds to the opening portion of the first electrode is charged. At this time, the first electrode functions as an electron supply source.

Next, at the second stage, the drive voltage abruptly changes, and the drive voltage that has changed is applied between the first electrode and the second electrode such that the electric potential of the first electrode is higher than the reference electric-potential, whereas the electric potential of the second electrode is lower than the reference electric-potential. By so doing, an electric field induced by the drive voltage causes polarization of the emitter layer to be inverted such that negative charges appear in the first surface of the emitter layer. Accordingly, electrons that have adhered to the portion of the first surface of the emitter layer corresponding to the opening portion of the first electrode at the first stage are subjected to electrostatic repulse force induced by the inversion of polarization and fly from the first surface of the emitter layer. The electrons that have flown from the first surface are emitted to the exterior of the electron emitter through the opening portion.

Such an operation allows relatively easy control of the quantity of the charge on the emitter layer at the first stage, so that high electron emission quantity can be stably provided with high controllability.

Since the opening portion of the first electrode apart from the first surface of the emitter layer can function like a gate electrode or a focusing electron lens with respect to electrons emitted from the first surface of the emitter layer, rectilinearity of emitted electrons can be enhanced.

In the above-mentioned configuration, by forming a plurality of opening portions in the first electrode, electron emission from a single electron emitter can be uniform, or free of biasing and variations in a region occupied by the first electrode.

Preferably, the electron emitter according to the present invention comprises an emitter layer, a first electrode, and a second electrode that are similar to those mentioned above, and is configured such that the emitter layer emits electrons through an opening of the opening portion when a drive voltage is applied between the first electrode and the second electrode. In the electron emitter, the first electrode is formed of an aggregation of conductive particles, each having an elongated cross section, which are disposed on or above the emitter layer such that the longitudinal direction of the cross section of the conductive particle extends along the first surface, and the opening portion is formed by peripheral edge portions of the conductive particles.

According to the above configuration, the first electrode is formed by disposing a plurality of conductive particles, each having an elongated cross section, on or above the first surface of the emitter layer such that the longitudinal direction of the cross section extends along the first surface, and the opening portion is formed by peripheral edge portions of the conductive particles. Accordingly, the above-mentioned gap between the emitter layer and the opening portion of the first electrode can be readily formed, and the above-mentioned overhanging portion can be readily imparted to the opening portion of the first electrode.

Particles of various forms can be employed as the conductive particles each having an elongated cross section. Examples of such particles include scale-like particles, disk-like particles, coil-spring-like particles, hollow and cylindrical particles (tubelike particles), and particles whose cross-sectional shape is rod-like, needle-like, semispherical, elliptical, or semielliptical.

A plurality of conductive particles are disposed on or above the first surface of the emitter layer such that the longitudinal direction thereof extends along the first surface. In this case, the longitudinal direction is not necessarily parallel with the first surface of the emitter layer. The conductive particles may be disposed on the first surface in a generally "lying" condition such that the gap and the overhanging portion that yield the above-mentioned action are formed. For example, the angle formed between the longitudinal direction of the cross section of each conductive particle and the first surface of the emitter layer is set to about 30 degrees or less.

Preferably, in the electron emitter according to the present invention, the emitter layer is formed of a polycrystalline material; the first electrode is composed of primary particles of the conductive particles and/or secondary particles formed through aggregation of the primary particles disposed on or above the first surface of the emitter layer; and the primary particles or the secondary particles each have an elongated cross section, the length of which is greater than the average grain size of crystal grains of the polycrystalline material.

In the case of a polycrystalline material, concavities are likely to be formed at grain boundaries. Accordingly, by utilization of the concavities, the above-mentioned overhanging portion is likely to be formed merely by disposing a plurality of the primary or secondary particles of the conductive particles on the first surface of the emitter layer.

Preferably, in the electron emitter according to the present invention, the first electrode is comprised of graphite. Graphite powder is of conductive particles each having a relatively sharp edged shape, such as a scale-like shape. In other words, particles of graphite powder each have an elongated cross section. Accordingly, by using graphite powder to form the first electrode, there can be readily implemented the gap between the emitter layer and the opening portion of the first electrode, the overhanging portion of the opening portion of the first electrode, and the shape of the opening portion which causes lines of electric force to concentrate at the inner edge thereof.

Preferably, in the electron emitter according to the present invention, the first electrode further contains conductive fine particles. More preferably, the fine particles are exposed on the surface of the first electrode. Exposed fine particles serve as convexities from the surface of the first electrode. Such projecting condition allows the fine particles to potentially serve as electric field concentration points, so that the number of electron-emitting sites can be increased accordingly. More preferably, the emitter layer also carries the conductive fine particles adhering to the first surface in an area corresponding to the opening portion. The adhering fine particles serve as micro floating electrodes on the emitter layer formed of a dielectric material. The floating electrodes are favorable in terms of large-quantity accumulation of electrons emitted toward the emitter layer from the first electrode, so that electron emission quantity of the electron emitter can be increased accordingly. Use of the fine particles to form the floating electrodes allows provision of the floating electrodes on the first surface of the emitter layer by a simple process; for example, by applying a mixture of the fine particles and a material for the first electrode to the first surface of the emitter layer when the first electrode is to be formed on the first surface.

Preferably, in the electron emitter according to the present invention, the conductive fine particles are comprised of silver. This allows easy, inexpensive implementation of the first electrode containing conductive fine particles. Particularly, in the case where the first electrode is comprised of graphite, and the process of forming the first electrode includes a thermal process in an oxygen-gas-contained atmosphere, the thermal causes graphite around fine particles of silver to be oxidized and eroded. As a result, a peripheral edge portion of the first electrode is likely to have a sharp edge profile, and through holes are formed in the first electrode and serve as the opening portions. Accordingly, the number of electric field concentration points further increase, so that a more favorable electrode profile can be obtained.

The electron emitter having the above-mentioned configuration is fabricated by the following method.

The method comprises the steps of preparing a paste composed of a dispersion medium, and conductive particles dispersed in the dispersion medium and having an elongated cross section; forming a film of the paste on or above the first surface of the emitter layer; and sintering the film to thereby form the first electrode.

By this method (if needed, appropriately adjusting the viscosity and mixing ratio of the paste), and by virtue of the action of, for example, the weight and surface energy of the conductive particles during the period between formation of the above-mentioned film and completion of sintering of the film, the conductive particles can be brought into the aforementioned "lying" condition. Thus, a favorable electron emitter in which a gap is formed between the emitter layer and the opening portion of the first electrode and in which the opening portion of the first electrode assumes a overhanging portion can be readily fabricated.

Preferably, in the above-mentioned fabricating method, the step of preparing the paste includes dispersing the conductive fine particles in the dispersion medium. This allows easy fabrication of an electron emitter in which an increased number of electric field concentration points are present and which exhibits enhanced electron emission quantity.

As described above, the electron emitter according to the present invention can readily excite high electric field concentration and can increase the number of electric field concentration points. Therefore, the present invention can provide an electron emitter having enhanced electron emission quantity.

DESCRIPTION OF THE PREFERRED EMBODIMENTS

Embodiments of an electron emitter according to the present invention will next be described in detail with reference to the drawings.

Electron emitters according to embodiments of the present invention are applicable to electron beam irradiation apparatus, light sources, LED alternatives, electronic parts manufacturing apparatus, and electronic circuit components, in addition to display apparatus.

An electron beam in an electron beam irradiation apparatus has a higher energy and a better absorption capability than ultraviolet rays in ultraviolet ray irradiation apparatus that are presently in widespread use. The electron emitters may be used to solidify insulating films in superposing wafers for semiconductor devices, harden printing inks without irregularities for drying prints, and sterilize medical devices while being kept in packages.

The electron emitters may also be used as high-luminance, high-efficiency light sources for use in projectors, for example, which may employ ultrahigh-pressure mercury lamps. If the electron emitters according to the present invention are applied to light sources, then the light sources are reduced in size, have a longer service life, can be turned on at high speed, and pose a reduced environmental burden because they are free of mercury.

The electron emitters may also be used as LED alternatives in surface light sources such as indoor illumination units, automobile lamps, flat lamps such as traffic signal devices, and also in chip light source, traffic signal devices, and backlight units for small-size liquid-crystal display devices for cellular phones.

The electron emitters may also be used in electronic parts manufacturing apparatus as electron beam sources for film growing apparatus such as electron beam evaporation apparatus, electron sources for generating a plasma (to activate a gas or the like) in plasma CVD apparatus, and electron sources for decomposing gases. The electron emitters may also be used in vacuum micro devices including ultrahighspeed devices operable in a tera-Hz range and large-current output devices. The electron emitters may also preferably be used as printer components; i.e., light emission devices for applying light to a photosensitive drum in combination with a phosphor, and electron sources for charging dielectric materials.

The electron emitters may also be used in electronic circuit components including digital devices such as switches, relays, diodes, etc. and analog devices such as operational amplifiers, etc. as they can be designed for outputting large currents and higher amplification factors.

First, an electron emitter according to a first embodiment of the present invention will be described with reference to FIGS. 1 to 8.

Figure 1:
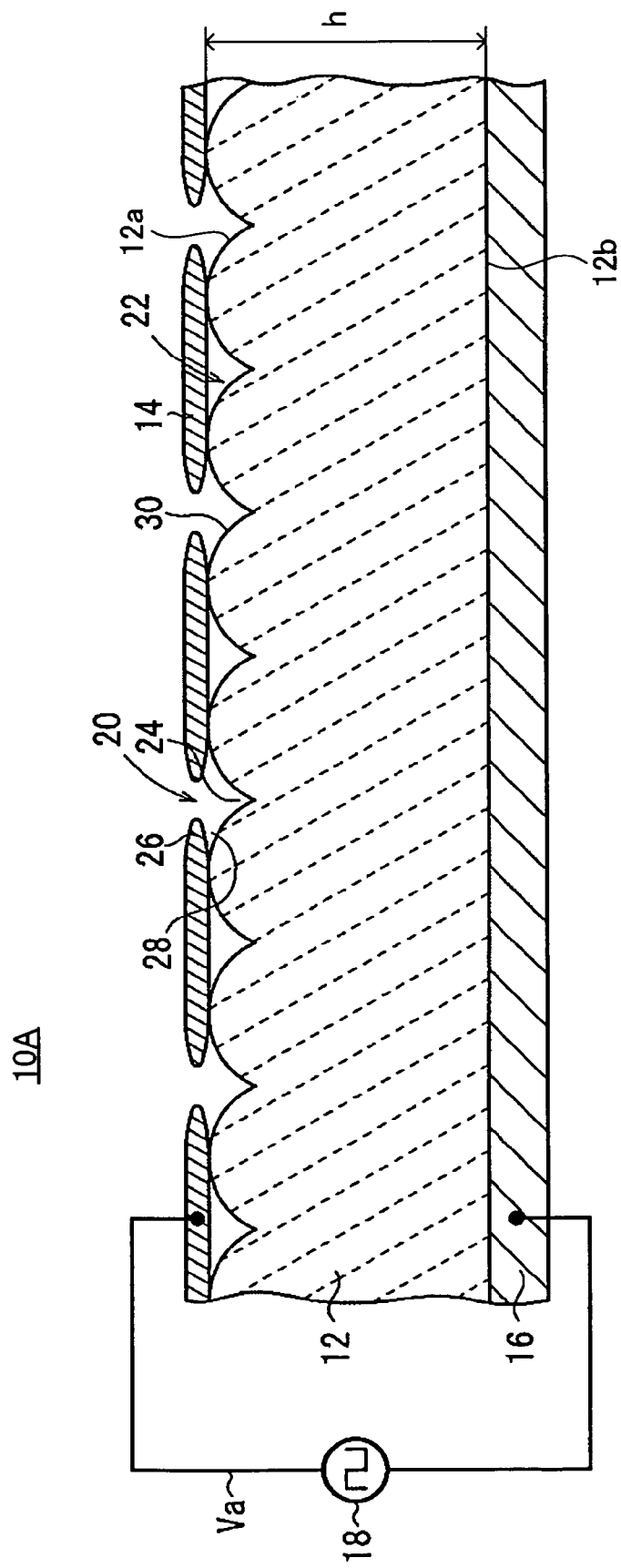
FIG. 1 is a fragmentary, sectional view showing an electron emitter according to a first embodiment of the present invention.

FIG. 1 is a partially enlarged sectional view showing an electron emitter 10A according to the first embodiment. As shown in FIG. 1, the electron emitter 10A includes a platelike emitter layer 12 formed of a dielectric material; an upper electrode 14, or a first electrode, formed on or above an upper surface 12a, or a first surface, of the emitter layer 12 and having opening portions 20; and a lower electrode 16, or a second electrode, formed on or below a lower surface 12b, or a second surface, of the emitter layer 12. A pulse generation source 18 is connected to the upper electrode 14 and the lower electrode 16 in order to apply a drive voltage Va between the upper electrode 14 and the lower electrode 16.

The electron emitter 10A is configured such that electrons supplied from the upper electrode 14 are accumulated on regions of the upper surface 12a corresponding to the opening portions 20, and then the accumulated electrons are emitted from the upper surface 12a to the exterior of the electron emitter 10A through the opening portions 20.

Notably, FIG. 1 shows a portion of a pair of the upper electrode 14 and the lower electrode 16 and other corresponding portions of the electron emitter 10A. The electron emitter 10A operates in a predetermined atmosphere of a vacuum. The vacuum level in the atmosphere (particularly the space above the upper surface 12a of the emitter layer 12 in FIG. 1) is preferably, for example, in the range from $10^2$ Pa to $10^{-6}$ Pa, more preferably in the range from $10^{-3}$ Pa to $10^{-5}$ Pa.

In the present embodiment, the emitter layer 12 is formed of a polycrystalline, dielectric material. A thickness h of the emitter layer 12 in FIG. 1 is determined in relation to a drive voltage as follows: when the drive voltage is applied between the upper electrode 14 and the lower electrode 16, electric field intensity is such that polarization is inverted in the emitter layer 12, but dielectric breakdown does not occur. For example, in the case where the emitter layer 12 has a dielectric breakdown voltage of 10 kV/mm or more, and a drive voltage of 100 V is applied, the thickness h of the emitter layer 12 may be theoretically 10 µm or more. However, in view of margin against dielectric breakdown, the thickness h of the emitter layer 12 is preferably set to about 20 µm. The crystal grain size of a dielectric material used to form the emitter layer 12 is preferably in the range from 0.1 µm to 10 µm, more preferably 2 µm to 7 µm. In the example illustrated in FIG. 1, the crystal grain size of the dielectric material is 3 µm. The crystal grain size of the emitter layer 12 can be obtained, for example, as follows: grains viewed in plane are approximated to circles having areas identical to those of the grains viewed in plane, and the average diameter of the circles is calculated and used as the crystal grain size.

In the present embodiment, the thickness of the lower electrode 16 may be 20 µm or less, preferably 5 µm or less.

In the present embodiment, the upper electrode 14 has a thickness t that satisfies $0.1\ \mu m \leq t \leq 20\ \mu m$, and has a plurality of the opening portions 20 through which the emitter layer 12 is exposed to the exterior of the electron emitter 10A. Since the emitter layer 12 is formed of a polycrystalline material as mentioned previously, concavities and convexities 22 derived from grain boundaries of the dielectric material are formed on the upper surface 12a of the emitter layer 12. The opening portions 20 of the upper electrode 14 are formed in regions corresponding to concavities 24 of the grain boundaries of the dielectric material. In the example illustrated in FIG. 1, the concavities 24 and the opening portions 20 are formed in one-to-one correspondence. However, in some cases, a single opening portion 20 is formed for a plurality of concavities 24.

Figure 2:
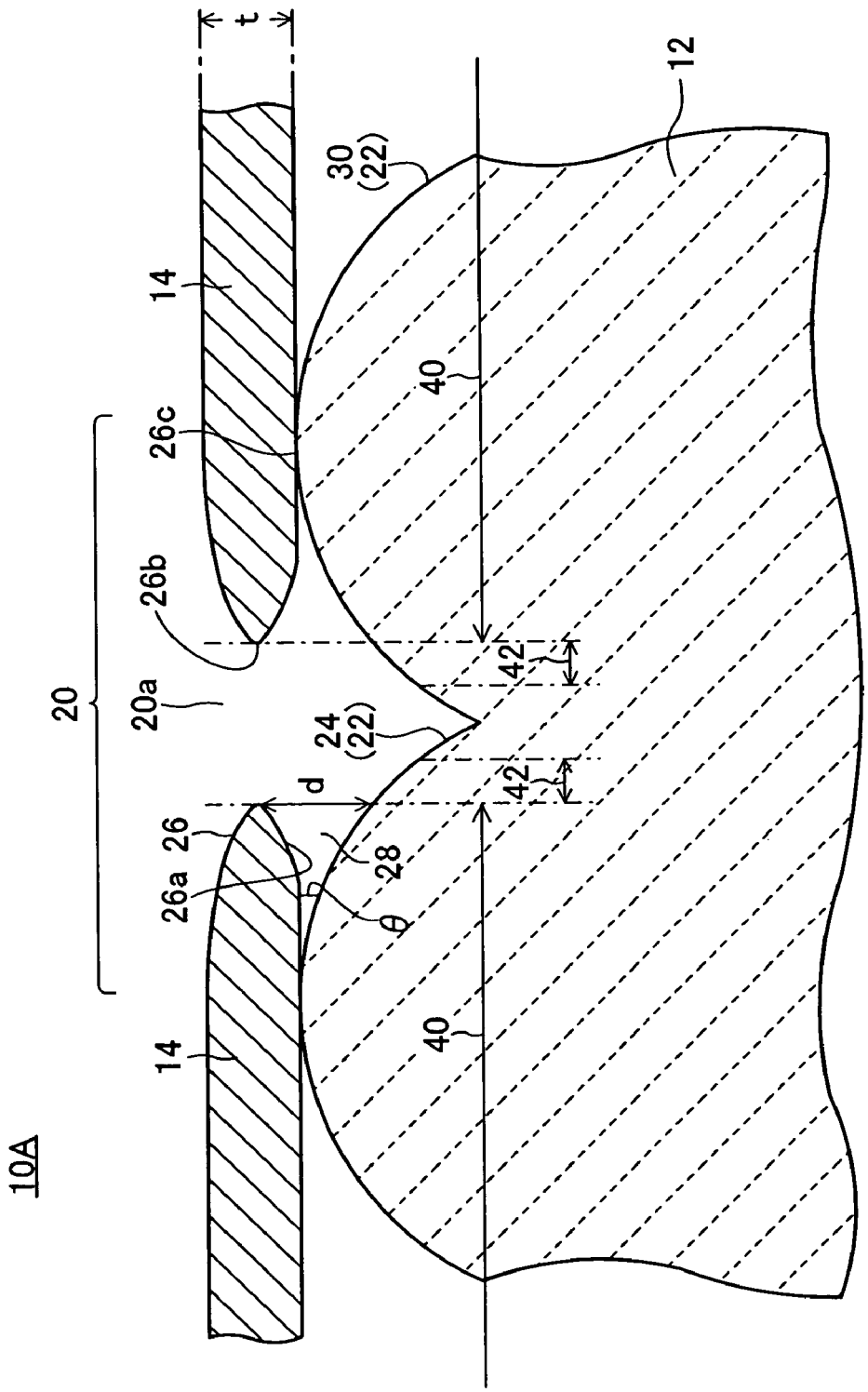
FIG. 2 is an enlarged sectional view showing essential portions of the electron emitter.

As shown in FIG. 2, the opening portion 20 includes an opening 20a defined by the inner edge of the opening portion 20, and a surrounding portion 26 that surrounds the opening 20a. A surface 26a of the surrounding portion 26 of the opening portion 20 that faces the emitter layer 12 is apart from the emitter layer 12. In other words, a gap 28 is formed between the emitter layer 12 and the surface 26a of the surrounding portion 26 of the opening portion 20, the surface 26a facing the emitter layer 12. The surrounding portion 26 of the opening portion 20 of the upper electrode 14 assumes the form of an overhanging portion (flange). Accordingly, in the subsequent description, the "surrounding portion 26 of the opening portion 20 of the upper electrode 14" is called a "overhanging portion 26 of the upper electrode 14." The "surface 26a of the surrounding portion 26 of the opening portion 20 of the upper electrode 14 that faces the emitter layer 12" is called a "lower surface 26a of the overhanging portion 26 of the upper electrode 14." In FIGS. 1 to 6, the cross sections of convexities 30 of concavities and convexities 22 in grain boundaries of the dielectric material are depicted as being semicircular. However, the cross-sectional shape of the convexities 30 is not limited thereto.

In the present embodiment, the upper surface 12a of the emitter layer 12; i.e., the surface of the convexity 30 (the wall surface of the concavity 24) in grain boundaries of the dielectric material, and the lower surface 26a of the overhanging portion 26 of the upper electrode 14 form a maximum angle θ that satisfies $1° \leq \theta \leq 60°$. A maximum gap d measured vertically between the surface of the convexity 30 (the wall surface of the concavity 24) in grain boundaries of the dielectric material of the emitter layer 12 and the lower surface 26a of the overhanging portion 26 of the upper electrode 14 is set so as to satisfy $0\ \mu m < d \leq 10\ \mu m$.

Figure 3:
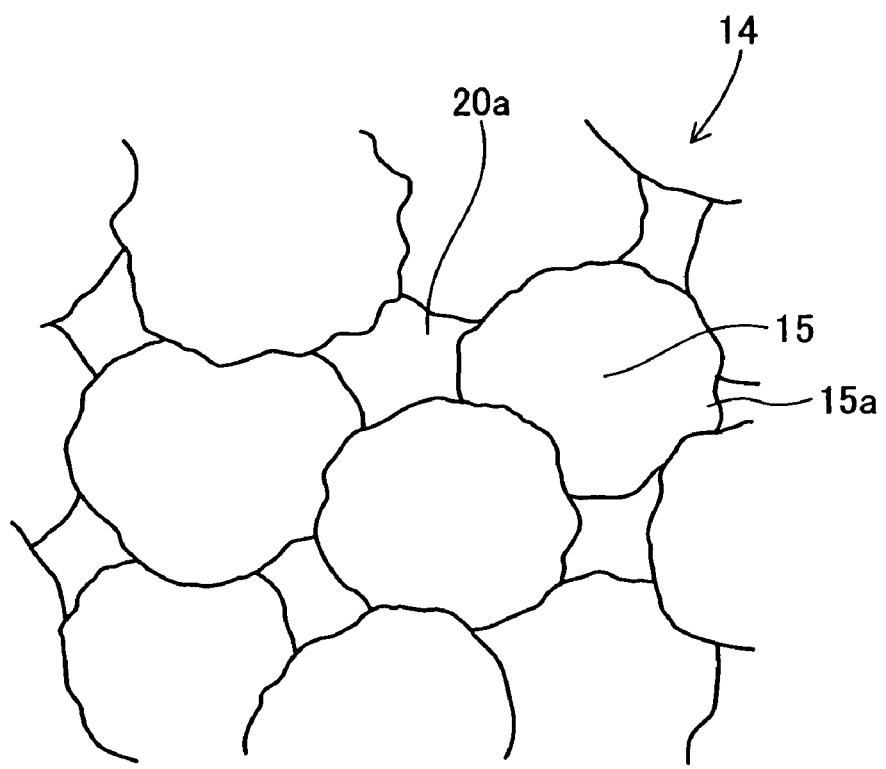
FIG. 3 is a fragmentary plan view showing an example shape of an opening portion of an upper electrode of the electron emitter.

Further, in the present embodiment, as shown in FIG. 3, the upper electrode 14 is formed of a large number of scale-like conductive particles 15 (e.g., graphite). The upper electrode 14 is formed in the following manner: the conductive particles 15 are disposed on the first surface 12a of the emitter layer 12 such that the longitudinal direction of the cross sections of the conductive particles 15 extends along the first surface 12a; i.e., such that the conductive particles 15 are in the "lying" condition. Specifically, the conductive particles 15 are disposed on the first surface 12a of the emitter layer 12 such that the longitudinal direction of the cross section of each conductive particle 15 and the first surface 12a (a smooth, virtual plane resulting from leveling the concavities and convexities 22 derived from grain boundaries) of the emitter layer 12 form an angle of about 30 degrees or less.

The conductive particles 15 used in the present embodiment are such that their primary particles each have a size (a longest longitudinal length of the cross section of the primary particle) greater than the grain size of the dielectric material used to form the emitter layer 12. In the example illustrated in FIG. 1, since the grain size of the emitter layer 12 is 3 µm, the size of each of the primary particles of the conductive particles 15 is preferably about 5 µm or more.

As shown in FIG. 3, the opening portions 20 viewed in plane are formed by peripheral edge portions 15a of a large number of the conductive particles 15. In other words, the opening 20a of the opening portion 20 is a space surrounded by the peripheral edge portions 15a of a plurality of the conductive particles 15, and the above-mentioned overhanging portion 26 is formed by the peripheral edge portions 15a of a plurality of the conductive particles 15.

Triple junctions (formed by contact among the upper electrode 14, the emitter layer 12, and a vacuum) 26c are formed at contact sites among the upper surface 12a of the emitter layer 12, the upper electrode 14, and a medium (e.g., a vacuum) surrounding the electron emitter 1A. The triple junctions 26c are sites (electric field concentration points) where lines of electric force concentrate (where electric field concentration occurs) when the drive voltage Va is applied between the upper electrode 14 and the lower electrode 16. "Concentration of lines of electric force" means a state in which lines of electric force generated from the lower electrode 16 concentrate at particular sites, when the lines of electric force are drawn under the condition in which the upper electrode 14, the emitter layer 12, and the lower electrode 16 have the cross sections of infinitely extending plates, and the end of the lines of electric force on the lower electrode 16 are set at even intervals. The state of the concentration of lines of electric force (the state of electric field concentration) can be readily simulated by numerical analysis that employs the finite-element method. The triple junctions 26c are formed not only at sites corresponding to the opening portions 20 but also at a peripheral edge portion of the upper electrode 14.

Further, in the present embodiment, the opening portions 20 are shaped such that the inner edges 26b thereof serve as electric field concentration points. Specifically, the overhanging portion 26 of the opening portion 20 has such a cross-sectional shape as to be acutely pointed toward the inner edge 26b, or the tip end of the overhanging portion 26, (the thickness gradually reduces). The upper electrode 14 whose opening portions 20 are formed in such a shape can be formed by the following simple method. The conductive particles 15, each having an elongated cross section, are disposed on or above the first surface 12a of the emitter layer 12 such that the longitudinal directions of the cross sections of the conductive particles 15 extend along the first surface 12a; i.e., the conductive particles 15 are in the "lying" condition.

The opening portions 20 are formed such that, when the openings 20a viewed in plane are approximated to circles having areas identical to those of the openings 20a viewed in plane, the average diameter of the circles is in the range from 0.1 μm to 20 μm. The reason for this is described below.

Referring to FIG. 2, regions of the emitter layer 12 where polarization is inverted or changes in accordance with the drive voltage Va applied between the upper electrode 14 and the lower electrode 16 (FIG. 1) are regions (first regions) 40 located just under the upper electrode 14, and regions (second regions) 42 corresponding to regions of the opening portions 20 that extend from the inner edges (inner peripheries) of the opening portions 20 toward the centers of the opening portions 20. Particularly, the range of the second region 42 varies depending on the level of the drive voltage Va and the degree of electric field concentration in the second region 42. When the opening portions 20a have an average diameter of 0.1 μm to 20 μm as in the present embodiment, electrons are efficiently emitted in a sufficient quantity through the opening portions 20. In other words, when the average diameter of the openings 20a is less than 0.1 μm, the area of the second regions 42, which are primary regions for accumulating electrons supplied from the upper electrode 14 to thereby contribute to emission of electrons, decreases, resulting in a reduction in the quantity of electrons to be emitted. When the average diameter of the openings 20a is in excess of 20 μm, the ratio of the second regions 42 to regions of the emitter layer 12 exposed through the opening portions 20 (occupancy of the exposed regions) decreases, resulting in a drop in electron emission efficiency.

Figure 4:
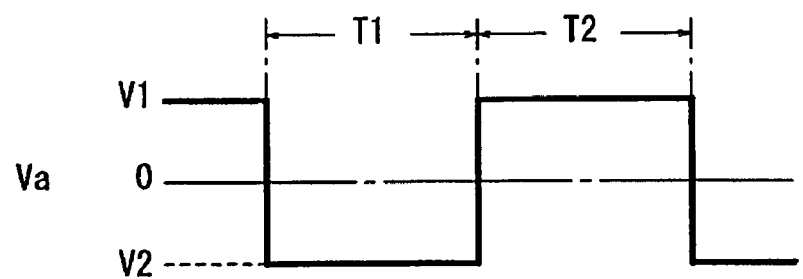
FIG. 4 is a diagram showing the waveform of a drive voltage to be applied to the electron emitter.
Figure 5:
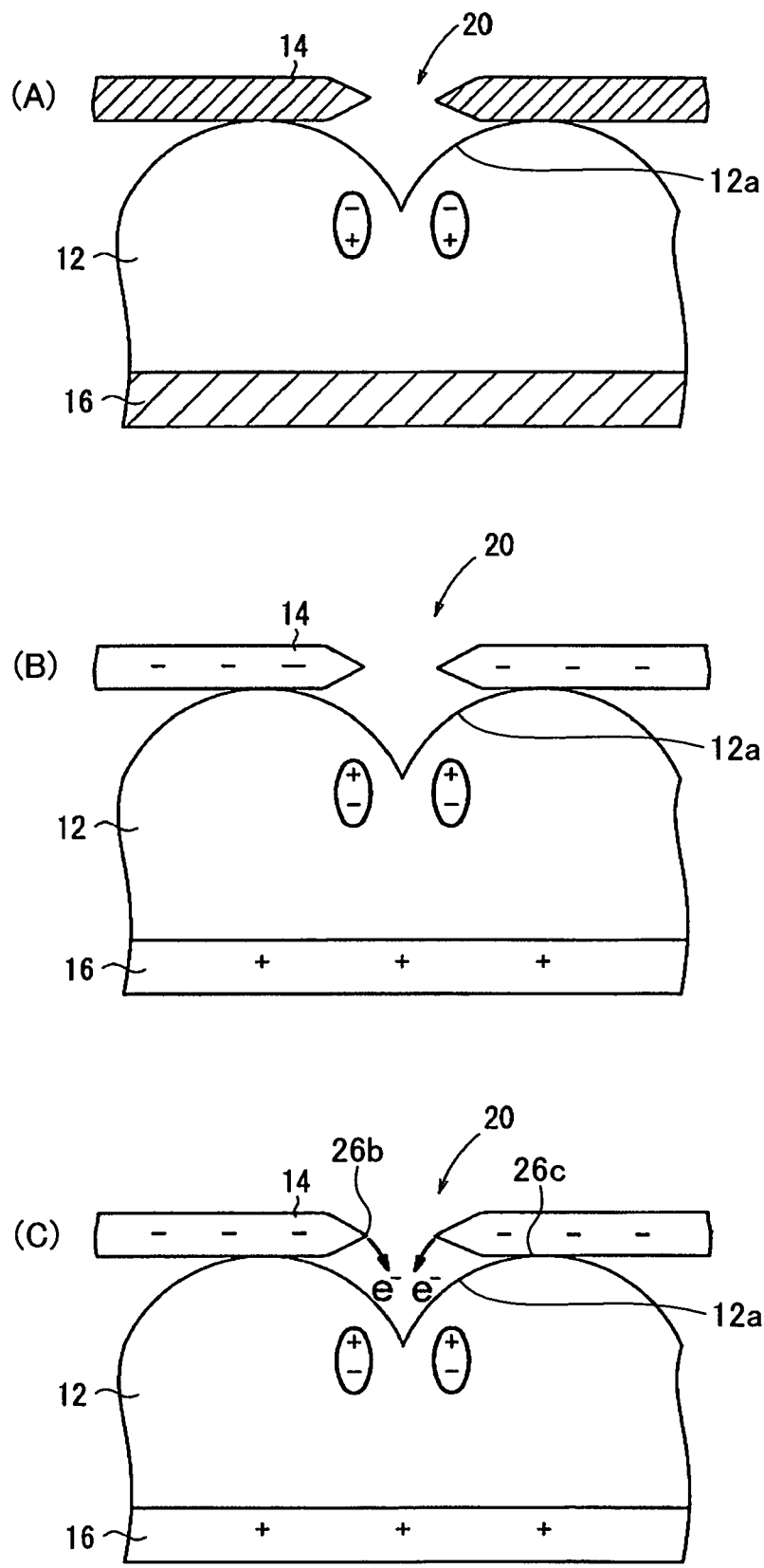
FIG. 5 is a set of explanatory views showing operation of the electron emitter.
Figure 6:
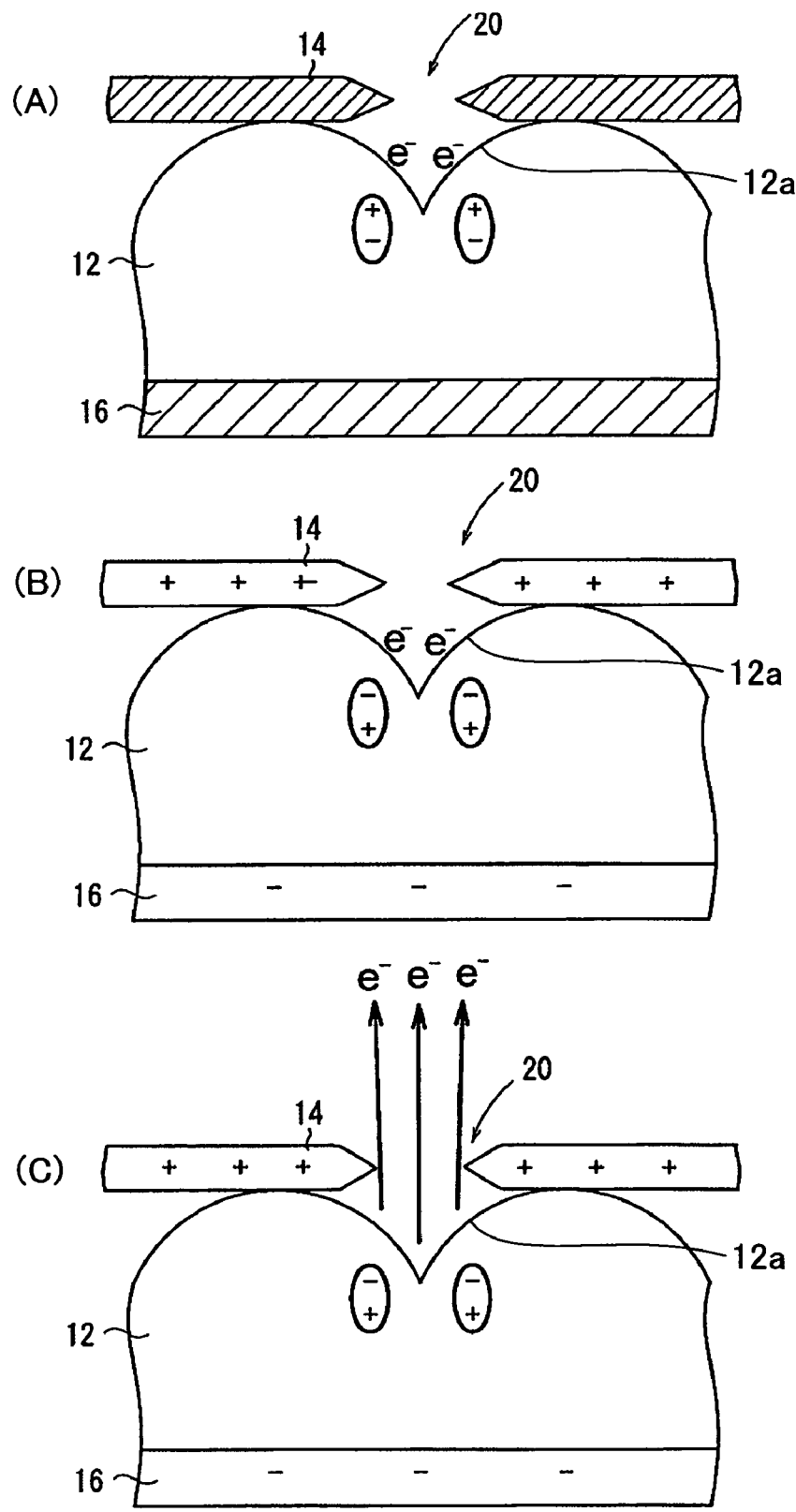
FIG. 6 is a set of explanatory views showing operation of the electron emitter.

Next, the principle of electron emission of the electron emitter 10A will be described with reference to FIGS. 4 to 6. In the present embodiment, as shown in FIG. 4, the drive voltage Va to be applied between the upper electrode 14 and the lower electrode 16 is of a rectangular waveform having a period of T1+T2. Specifically, the reference voltage is 0 V; during time T1 corresponding to the first stage, the electric potential of the upper electrode 14 is V2 (negative voltage), which is lower than the electric potential of the lower electrode 16; and during time T2 corresponding to the second stage, the electric potential of the upper electrode 14 is V1 (positive voltage), which is higher than the electric potential of the lower electrode 16.

In the initial state, the emitter layer 12 is polarized unidirectionally. Subsequent description assumes that the emitter layer 12 is initialized such that the negative poles of dipoles face toward the upper surface of the emitter layer 12 (FIG. 5A).

First, in the initial state in which the reference voltage is applied, as shown in FIG. 5A, the negative poles of dipoles face toward the upper surface of the emitter layer 12, so that electrons are hardly accumulated on the upper surface of the emitter layer 12.

Subsequently, when a negative voltage V2 is applied, polarization is inverted (FIG. 5B). This inversion of polarization causes electric field concentration to occur at the inner edge 26b and the triple junction 26c, which are electric field concentration points, so that electrons are emitted (supplied) from the electric field concentration points of the upper electrode 14 toward the upper surface 12a of the emitter layer 12. Thus, electrons are accumulated, for example, in a region of the upper surface 12a exposed through the opening portion 20 of the upper electrode 14 and in a region of the upper surface 12a in the vicinity of the overhanging portion 26 of the upper electrode 14 (FIG. 5C). In other words, the upper surface 12a is charged. This charging can be continued until a predetermined saturated condition, which depends on the surface resistance of the emitter layer 12, is reached. However, the quantity of the charge can be controlled by means of the time of application of a control voltage. In this manner, the upper electrode 14 (particularly the above-mentioned electric field concentration points) functions as an electron supply source for the emitter layer 12 (upper surface 12a).

Subsequently, the negative voltage V2 drops to the reference voltage as shown in FIG. 6A. Then, a positive voltage V1 is applied, thereby causing re-inversion of polarization (FIG. 6B). As a result, Coulomb repulsion induced by the negative poles of dipoles causes the accumulated electrons to be emitted from the upper surface 12a toward the exterior of the electron emitter 10A through the opening 20a (FIG. 6C).

Also, electrons are similarly emitted from peripheral edge portions of the upper electrode 14 at which the opening portions 20 are absent.

Figure 7:
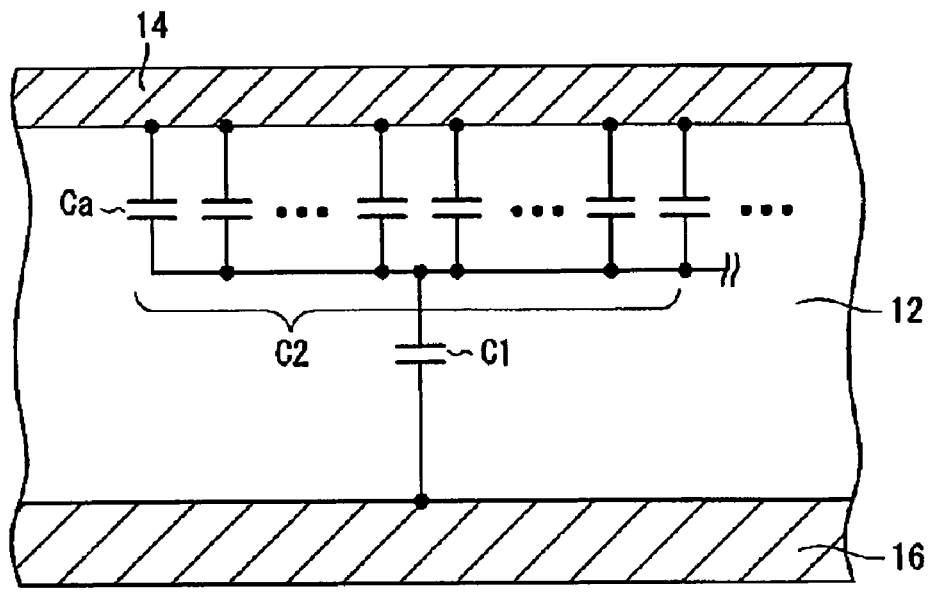
FIG. 7 is an equivalent circuit diagram for explaining influence of a gap between the upper electrode and an emitter layer on an electric field between the upper electrode and a lower electrode.

As shown in FIG. 7, the electron emitter 10A according to the first embodiment has in its electrical operation a capacitor C1 due to the emitter layer 12 and a cluster of capacitors Ca due to respective gaps 28, disposed between the upper electrode 14 and the lower electrode 16. The capacitors Ca due to the respective gaps 28 are connected parallel to each other into a single capacitor C2. In terms of an equivalent circuit, the capacitor C1 due to the emitter layer 12 is connected in series to the capacitor C2 which comprises the cluster of capacitors Ca.

Actually, the capacitor C1 due to the emitter layer 12 is not directly connected in series to the capacitor C2 which comprises the cluster of capacitors Ca, but the capacitive component that is connected in series varies depending on the number of the opening portions 20 formed in the upper electrode 14 and the overall area of the opening portions 20.

Figure 8:
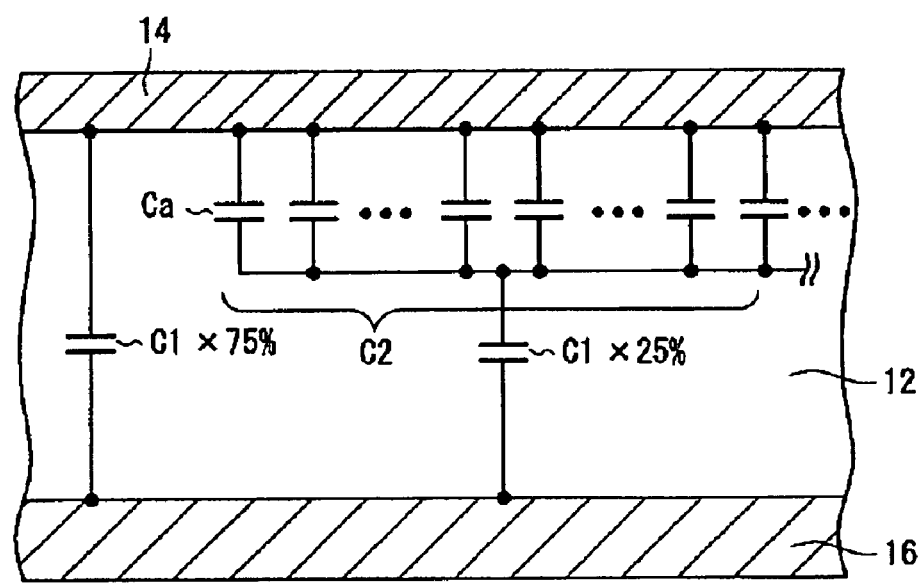
FIG. 8 is an equivalent circuit diagram for explaining influence of the gap between the upper electrode and the emitter layer on an electric field between the upper electrode and the lower electrode.

Capacitance calculations will be performed on the assumption that 25% of the capacitor C1 due to the emitter layer 12 is connected in series to the capacitor C2 which comprises the cluster of capacitors Ca, as shown in FIG. 8. Since the gaps 28 are in a vacuum, their relative dielectric constant thereof is 1. It is assumed that the maximum distance d across the gaps 28 is 0.1 μm, the area S of each gap 28 is S=1 μm×1 μm, and the number of the gaps 28 is 10,000. It is also assumed that the emitter layer 12 has a relative dielectric constant of 2000, the emitter layer 12 has a thickness of 20 μm, and the confronting area of the upper and lower electrode 14, 16 is 200 μm×200 μm. The capacitor C2 which comprises the cluster of capacitors Ca has a capacitance of 0.885 pF, and the capacitor C1 due to the emitter layer 12 has a capacitance of 35.4 pF. If the portion of the capacitor C1 due to the emitter layer 12 which is connected in series to the capacitor C2 which comprises the cluster of capacitors Ca is 25% of the entire capacitor C1, then that series-connected portion has a capacitance (including the capacitance of capacitor C2 which comprises the cluster of capacitors Ca) of 0.805 pF, and the remaining portion has a capacitance of 26.6 pF.

Because the series-connected portion and the remaining portion are connected in parallel to each other, the overall capacitance is 27.5 pF. This capacitance is 78% of the capacitance 35.4 pF of the capacitor C1 due to the emitter layer 12. Therefore, the overall capacitance is smaller than the capacitance of the capacitor C1 due to the emitter layer 12.

Consequently, the capacitance of the cluster of capacitors Ca due to the gaps 28 is relatively small. Because of the voltage division between the cluster of capacitors Ca and the capacitor C1 due to the emitter layer 12, almost the entire applied voltage Va is applied across the gaps 28, which are effective to produce a larger output of the electron emission.

Since the capacitor C2 which comprises the cluster of capacitors Ca is connected in series to the capacitor C1 due to the emitter layer 12, the overall capacitance is smaller than the capacitance of the capacitor C1 due to the emitter layer 12. This is effective to provide preferred characteristics, namely, the electron emission is performed for a larger output and the overall power consumption is lower.

As described above in detail, in the electron emitter 10A according to the present embodiment, the overhanging portions 26 are formed in the upper electrode 14, whereby the triple junctions 26c arise at sites different from the inner edges 26b of the upper electrode 14. Further, the opening portions 20 of the upper electrode 14 are shaped such that the inner edges 26b of the opening portions 20 serve as electric field concentration points. Accordingly, as compared with the case where no overhanging portion 26 is provided, the number of electric field concentration points can be increased greatly. Particularly, the overhanging portions 26 of the present embodiment each have such a cross-sectional shape as to be acutely pointed toward the inner edge 26b, or the tip end of the overhanging portion 26. Accordingly, as compared with the case where the inner edges 26b each have a right-angled or obtuse profile, the degree of electric field concentration is enhanced, whereby the quantity of electrons accumulated on the upper surface 12a of the emitter layer 12 can be increased.

Also, the upper surface 12a of the emitter layer 12; i.e., the surface of the convexity 30 (the wall surface of the concavity 24) in grain boundaries of the dielectric material, and the lower surface 26a of the overhanging portion 26 of the upper electrode 14 form the maximum angle θ that satisfies $1° \leq θ \leq 60°$; and the maximum gap d measured vertically between the surface of the convexity 30 (the wall surface of the concavity 24) in grain boundaries of the dielectric material of the emitter layer 12 and the lower surface 26a of the overhanging portion 26 of the upper electrode 14 is set so as to satisfy $0\ \mu m < d \leq 10\ \mu m$. These configurational features increase the degree of electric field concentration at the gaps 28, whereby the quantity of electrons accumulated on the upper surface 12a of the emitter layer 12 can be increased.

Further, the above-mentioned formation of the overhanging portions 26 brings about formation of the gaps 28 between the emitter layer 12 and the lower surfaces 26a of the overhanging portions 26 of the opening portions 20 of the upper electrode 14. The capacitance of virtual capacitors associated with the gaps 28 causes most of the drive voltage Va to be substantially applied to the gaps 28, whereby an electric field at the opening portions 20 is intensified. Accordingly, the absolute value of the drive voltage Va required to obtain a certain electric field intensity at the opening portions 20 can be reduced.

Since the overhanging portions 26 of the upper electrode 14 function as gate electrodes (control electrodes), such as focusing electron lenses, rectilinearity of emitted electrons can be enhanced. In the case where a large number of the electron emitters 10A are arrayed for use as, for example, an electron source for a display, such function is advantageous to a reduction of cross talk.

Particularly, in the present embodiment, the concavities and convexities 22 derived from grain boundaries of the dielectric material are formed at least on the upper surface 12a of the emitter layer 12, and the opening portions 20 of the upper electrode 14 are formed in regions corresponding to the concavities 24 of the grain boundaries of the dielectric material. Thus, the overhanging portions 26 of the upper electrode 14 can be readily implemented.

Since a plurality of the opening portions 20 are formed in the upper electrode 14, electrons are emitted from the opening portions 20 and from peripheral edge portions of the upper electrode 14. Accordingly, variations in an electron emitting characteristic over the entire electron emitter 10A are reduced, so that control of electron emission is facilitated, and electron emission efficiency is enhanced.

As described above, in the electron emitter 10A according to the present embodiment, high electric field concentration can be readily generated; the number of electron-emitting sites can be increased; and electric field intensity can be enhanced. Accordingly, electron emission quantity can be enhanced, and high electron emission efficiency can be implemented, so that an electron emitter with low drive voltage and low power consumption, and products to which the electron emitter is applied can be provided.

Next, a display 100 configured by use of the electron emitter 10A according to the present embodiment will be described with reference to FIG. 9.

Figure 9:
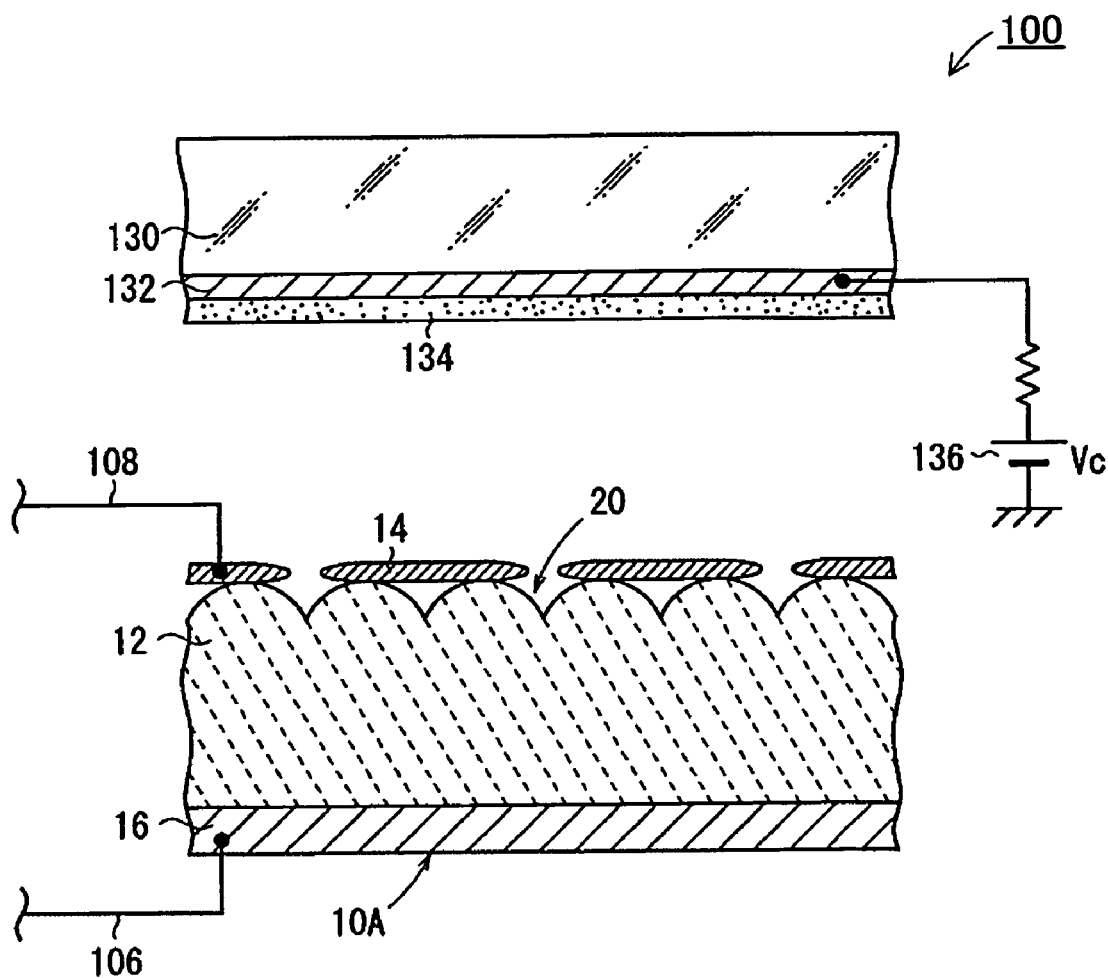
FIG. 9 is a schematic view showing the configuration of a display to which the electron emitter is applied.

As shown in FIG. 9, in the display 100, a transparent plate 130 made of, for example, glass or acrylic is disposed above the upper electrode 14; a collector electrode 132 formed of, for example, a transparent electrode is disposed on the rear surface (facing the upper electrode 14) of the transparent plate 130; and a phosphor 134 is applied to the collector electrode 132. A bias voltage source 136 (collector voltage Vc) is connected to the collector electrode 132 via a resistor. Needless to say, the electron emitter 10A is disposed within a vacuum. The vacuum level in the atmosphere is preferably in the range from $10^2$ Pa to $10^{-6}$ Pa, more preferably in the range from $10^{-3}$ Pa to $10^{-5}$ Pa.

The above range of vacuum is selected for the following reasons. A low vacuum level causes the following problems: (1) since a large number of gas molecules are present within a space, plasma is likely to be generated, and if plasma is generated too much, positive ions of the plasma collide with the upper electrode 14 and may accelerate damage to the upper electrode 14; and (2) emitted electrons collide with gas molecules before reaching the collector electrode 132, and thus there may arise a failure to sufficiently excite the phosphor 134 by electrons sufficiently accelerated by the collector voltage Vc.

In the case of a high vacuum level, electrons are readily emitted from points of electric field concentration; however, a support structure and a seal mechanism for maintaining a vacuum increase in size, causing a disadvantage to a reduction in size.

Figure 10:
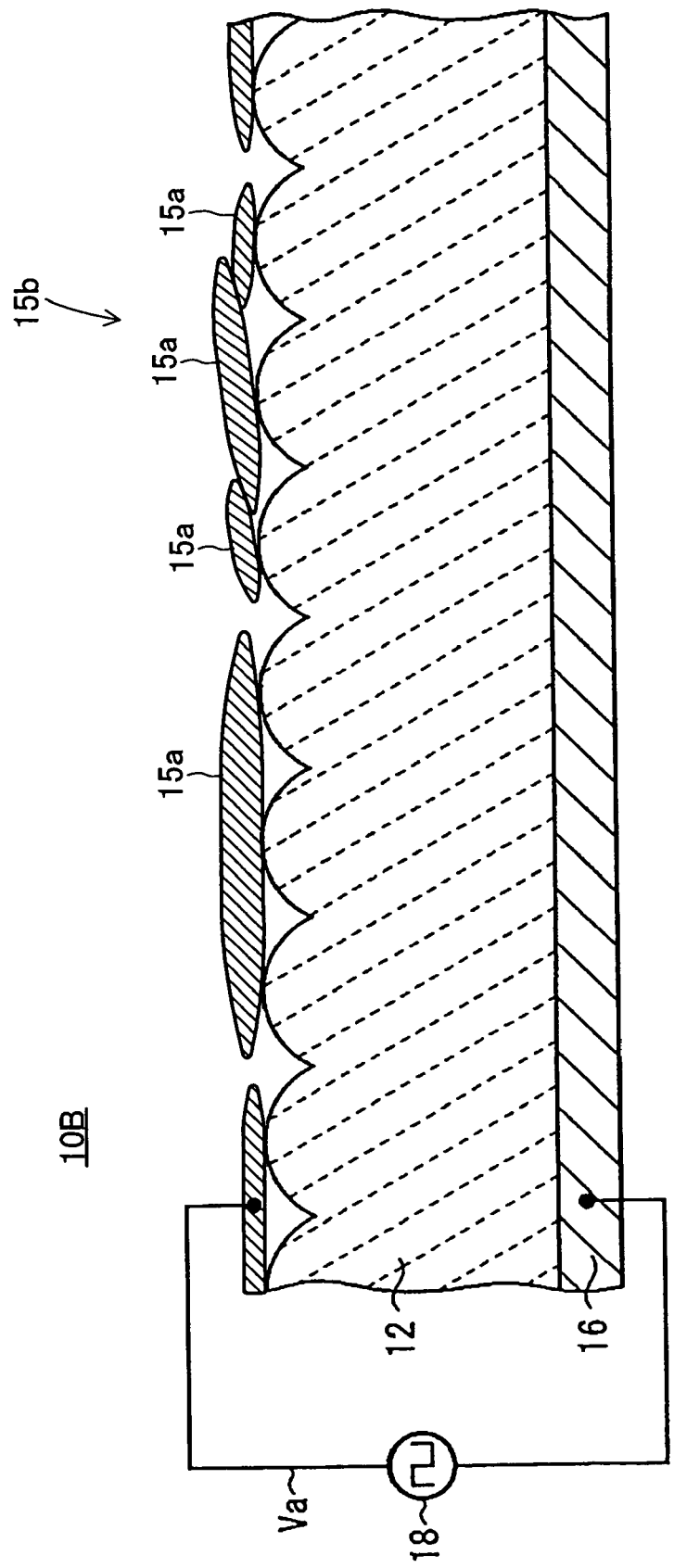
FIG. 10 is a fragmentary, sectional view showing an electron emitter according to a second embodiment of the present invention.

Next, an electron emitter 10B according to a second embodiment of the present invention will be described with reference to FIG. 10.

The electron emitter 10B according to the second embodiment is configured in a manner substantially similar to the electron emitter 10A according to the first embodiment. However, the conductive particles 15 used to form the upper electrode 14 are present on or above the upper surface 12a of the emitter layer 12 not only in the form of primary particles 15a but also in the form of secondary particles 15b. The length of an elongated cross section of each secondary particle 15b is greater than the grain size of crystal grains of the polycrystalline material used to form the emitter layer 12.

The electron emitter 10B according to the second embodiment also yields actions and effects similar to those that the electron emitter 10A according to the first embodiment yields.

Further, an electron emitter 10C according to a third embodiment of the present invention will be described with reference to FIG. 11.

The electron emitter 10C according to the third embodiment is configured in a manner substantially similar to the electron emitters 10A and 10B according to the first and second embodiments, respectively. However, the upper electrode 14 is consisted of not only the conductive particles 15 but also conductive fine particles 19. Preferably, the conductive fine particles 19 each have a size equivalent to or smaller than the thickness (a width perpendicular to the longitudinal direction of a cross section) of each of the primary particles of the conductive particles 15. For example, when the conductive particles 15 each have a thickness of about 2 μm, the average grain size of the conductive fine particles 19 is preferably 1 μm or less, more preferably 0.5 μm or less. Employment of such grain size readily establishes electrical conduction among the conductive particles 15 in the same upper electrode 14.

Figure 11:
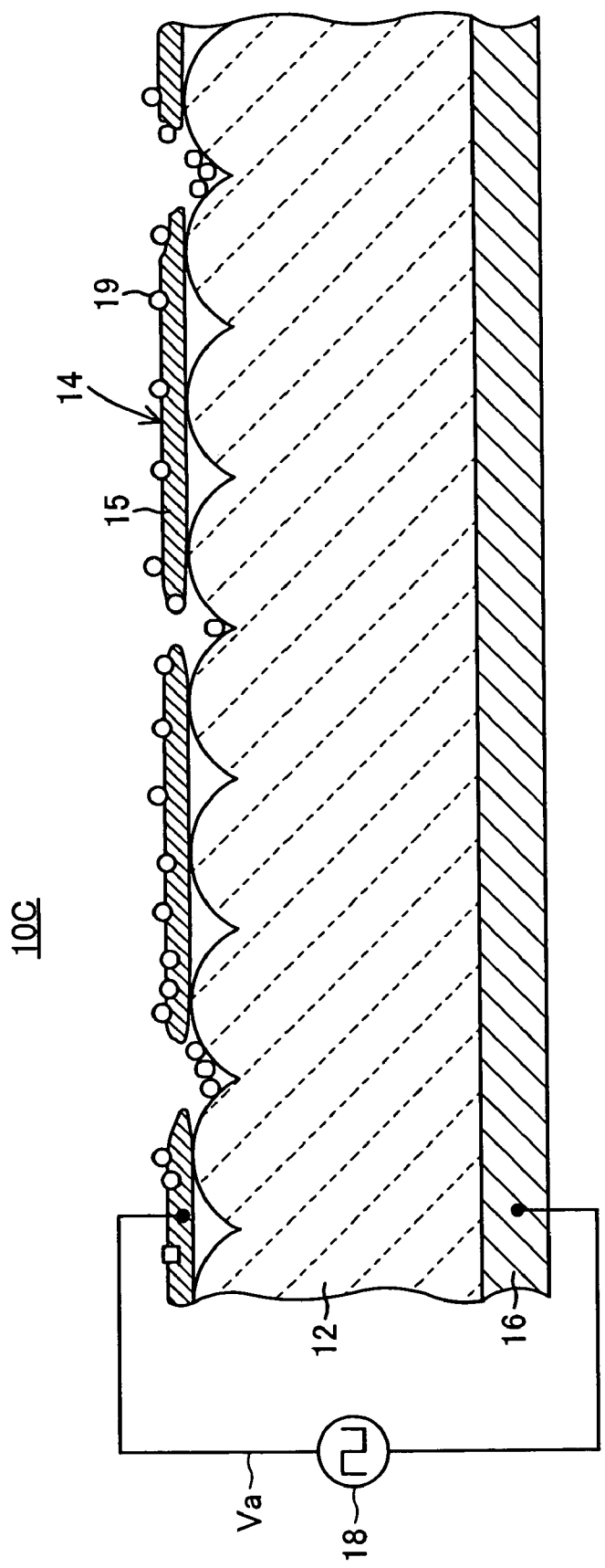
FIG. 11 is a fragmentary, sectional view showing an electron emitter according to a third embodiment of the present invention.
Figure 12:
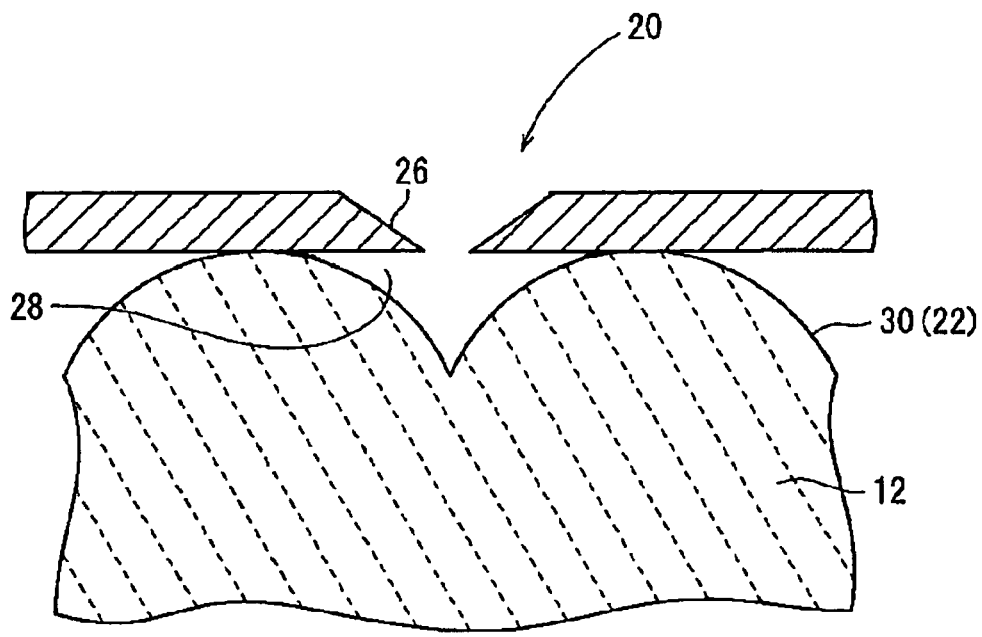
FIG. 12 is a sectional view showing a modification of a overhanging portion of the upper electrode in the electron emitters according to the first to third embodiments.
Figure 13:
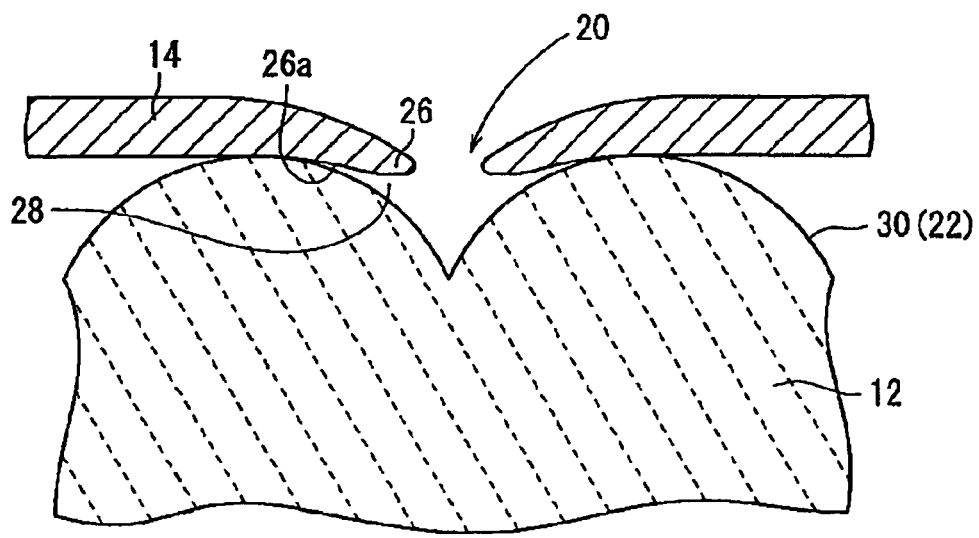
FIG. 13 is a sectional view showing another modification of the overhanging portion of the upper electrode.
Figure 14:
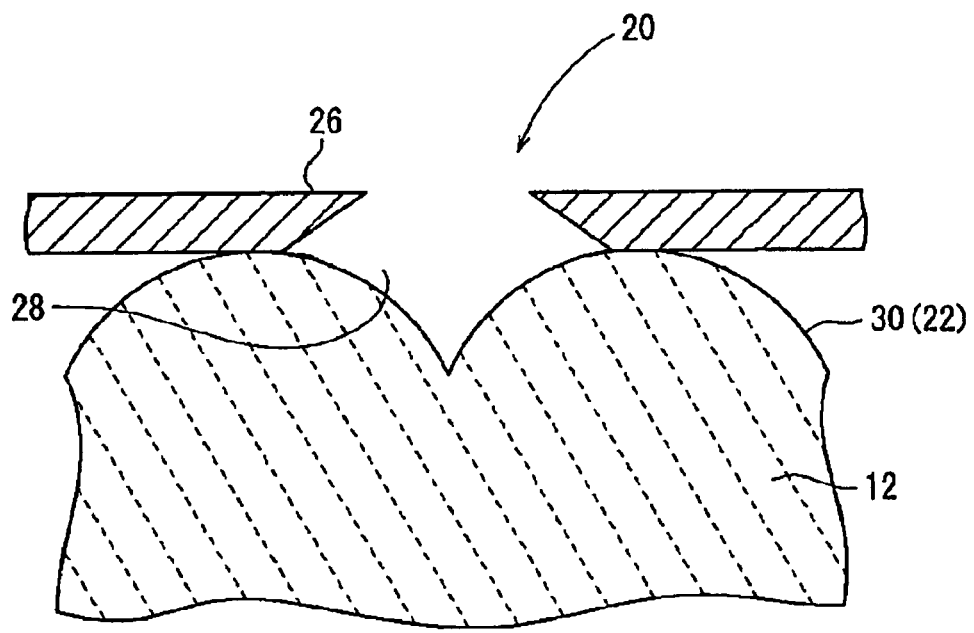
FIG. 14 is a sectional view showing still another modification of the overhanging portion of the upper electrode.
Figure 15:
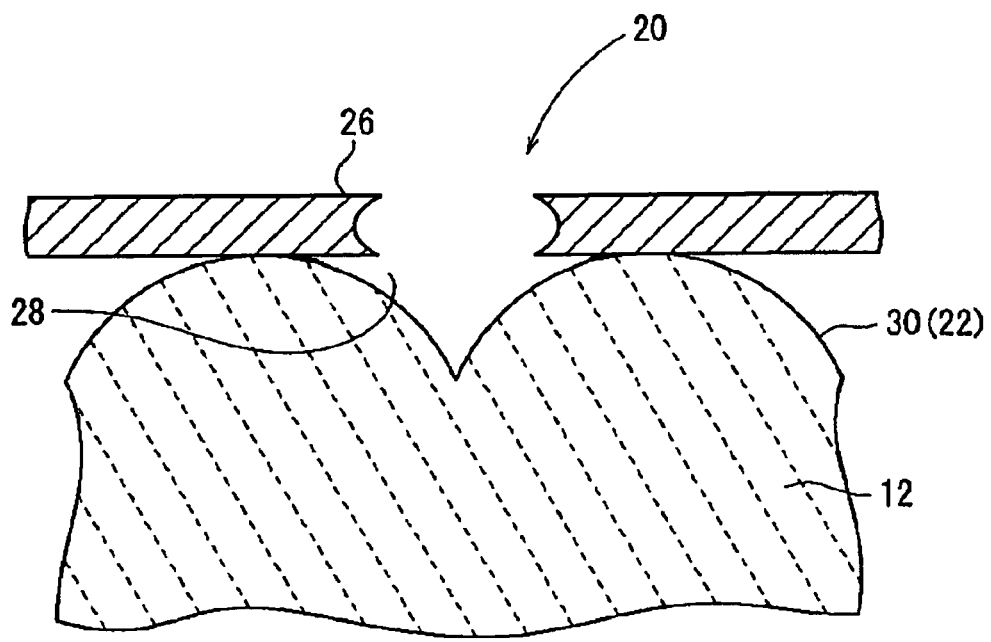
FIG. 15 is a sectional view showing a further modification of the overhanging portion of the upper electrode.

Preferably, as shown in FIG. 11, the conductive fine particles 19 are exposed at the surface of the upper electrode 14, particularly at the overhanging portions 26. Such exposed conductive fine particles 19 serve like convexities from the surface of the upper electrode 14; i.e., the exposed conductive fine particles 19 yield an effect similar to that yielded by convexities. Thus, the exposed conductive fine particles 19 can serve as electric field concentration points, so that the number of sites from which electrons are supplied to the upper surface 12a of the emitter layer 12 can be increased accordingly. More preferably, the conductive fine particles 19 also adhere to portions of the upper surface 12a of the emitter layer 12, the portions corresponding to the opening portions 20. Such adhering conductive fine particles 19 form micro floating electrodes on the emitter layer 12 formed of the dielectric material. The floating electrodes are favorable in terms of large-quantity accumulation of electrons emitted toward the emitter layer 12 from the upper electrode 14, so that electron emission quantity of the electron emitter 10C can be increased accordingly. Use of the conductive fine particles 19 to form the floating electrodes allows provision of the floating electrodes on the upper surface 12a of the emitter layer 12 by a simple process; for example, by applying a mixture of the conductive particles 15 and the conductive fine particles 19 to the upper surface 12a of the emitter layer 12 in the course of forming the upper electrode 14 on the upper surface 12a of the emitter layer 12.

In the case where a carbon material (e.g., graphite) is used to make the conductive particles 15; silver is used to make the conductive fine particles 19; and the process of making the upper electrode 14 includes a thermal process, the thermal process causes graphite or the like around fine particles of silver to be oxidized and eroded. As a result, a peripheral edge portion of the upper electrode 14 is likely to have a sharp edge profile, and through holes are formed in the upper electrode 14 and serve as the opening portions 20. Accordingly, the number of electric field concentration points further increase, so that a more favorable electrode profile can be obtained.

Next, a method of fabricating the electron emitter of the present invention having the above-described configuration will be described by way of example.

The dielectric material that the emitter layer 12 is made of may preferably be dielectric material having a relatively high dielectric constant, e.g., a dielectric constant of 1000 or higher. Dielectric materials of such a nature may be ceramics including barium titanate, lead zirconate, lead magnesium niobate, lead nickel niobate, lead zinc niobate, lead manganese niobate, lead magnesium tantalate, lead nickel tantalate, lead antimony tinate, lead titanate, lead magnesium tungstenate, lead cobalt niobate, etc. or a combination of any of these materials, a material which chiefly contains 50 weight % or more of any of these materials, or such ceramics to which there is added an oxide of such as lanthanum, calcium, strontium, molybdenum, tungsten, barium, niobium, zinc, nickel, manganese, or the like, or a combination of these materials, or any of other compounds.

For example, a two-component material nPMN-mPT (n, m represent molar ratios) of lead magnesium niobate (PMN) and lead titanate (PT) has its Curie point lowered for a larger specific dielectric constant at room temperature if the molar ratio of PMN is increased.

Particularly, a dielectric material where n=0.85-1.0 and m=1.0-n is preferable because its specific dielectric constant is 3000 or higher. For example, a dielectric material where n=0.91 and m=0.09 has a specific dielectric constant of 15000 at room temperature, and a dielectric material where n=0.95 and m=0.05 has a specific dielectric constant of 20000 at room temperature.

For increasing the specific dielectric constant of a three-component dielectric material of lead magnesium niobate (PMN), lead titanate (PT), and lead zirconate (PZ), it is preferable to achieve a composition close to a morphotropic phase boundary (MPB) between a tetragonal system and a quasi-cubic system or a tetragonal system and a rhombohedral system, as well as to increase the molar ratio of PMN. For example, a dielectric material where PMN:PT:PZ=0.375:0.375:0.25 has a specific dielectric constant of 5500, and a dielectric material where PMN:PT:PZ=0.5:0.375:0.125 has a specific dielectric constant of 4500, which is particularly preferable. Furthermore, it is preferable to increase the dielectric constant by introducing a metal such as platinum into these dielectric materials within a range to keep them insulative. For example, a dielectric material may be mixed with 20 weight % of platinum.

The emitter layer 12 may be in the form of a piezoelectric/electrostrictive layer or an antiferroelectric layer. If the emitter layer 12 comprises a piezoelectric/electrostrictive layer, then it may be made of ceramics such as lead zirconate, lead magnesium niobate, lead nickel niobate, lead zinc niobate, lead manganese niobate, lead magnesium tantalate, lead nickel tantalate, lead antimony tinate, lead titanate, barium titanate, lead magnesium tungstenate, lead cobalt niobate, or the like or a combination of any of these materials.

The emitter layer 12 may be made of chief components including 50 wt % or more of any of the above compounds. Of the above ceramics, the ceramics including lead zirconate is mostly frequently used as a constituent of the piezoelectric/electrostrictive layer of the emitter layer 12.

If the piezoelectric/electrostrictive layer is made of ceramics, then lanthanum, calcium, strontium, molybdenum, tungsten, barium, niobium, zinc, nickel, manganese, or the like, or a combination of these materials, or any of other compounds may be added to the ceramics. Alternatively, ceramics produced by adding $SiO_2$, $CeO_2$, $Pb_5Ge_3O_{11}$, or a combination of any of these compounds to the above ceramics may be used. Specifically, a material produced by adding 0.2 wt % of $SiO_2$, 0.1 wt % of $CeO_2$, or 1 to 2 wt % of $Pb_5Ge_3O_{11}$ to a PT-PZ-PMN piezoelectric material is preferable.

For example, the piezoelectric/electrostrictive layer should preferably be made of ceramics including as chief components lead magnesium niobate, lead zirconate, and lead titanate, and also including lanthanum and strontium.

The piezoelectric/electrostrictive layer may be dense or porous. If the piezoelectric/electrostrictive layer is porous, then it should preferably have a porosity of 40% or less.

If the emitter layer 12 is in the form of an antiferroelectric layer, then the antiferroelectric layer may be made of lead zirconate as a chief component, lead zirconate and lead tin as chief components, lead zirconate with lanthanum oxide added thereto, or lead zirconate and lead tin as components with lead zirconate and lead niobate added thereto.

The antiferroelectric layer may be porous. If the antiferroelectric layer is porous, then it should preferably have a porosity of 30% or less.

If the emitter layer 12 is made of strontium tantalate bismuthate ($SrBi_2Ta_2O_9$), then its polarization inversion fatigue is small. Materials whose polarization inversion fatigue is small are laminar ferroelectric compounds and expressed by the general formula of $(BiO_2)^{2+}(A_{m-1}B_mO_{3m+1})^{2-}$. Ions of the metal A are $Ca^{2+}$, $Sr^{2+}$, $Ba^{2+}$, $Pb^{2+}$, $Bi^{3+}$, $La^{3+}$, etc., and ions of the metal B are $Ti^{4+}$, $Ta^{5+}$, $Nb^{5+}$, etc. An additive may be added to piezoelectric ceramics of barium titanate, lead zirconate, and PZT to convert them into a semiconductor. In this case, it is possible to provide an irregular electric field distribution in the emitter layer 12 to concentrate an electric field in the vicinity of the interface with the upper electrode 14 which contributes to the emission of electrons.

The baking temperature can be lowered by adding glass such as lead borosilicate glass or the like or other compounds of low melting point (e.g., bismuth oxide or the like) to the piezoelectric/electrostrictive/antiferroelectric ceramics.

If the emitter layer 12 is made of piezoelectric/electrostrictive/antiferroelectric ceramics, then it may be a sheet-like molded body, a sheet-like laminated body, or either one of such bodies stacked or bonded to another support substrate.

If the emitter layer 12 is made of a non-lead-based material, then it may be a material having a high melting point or a high evaporation temperature so as to be less liable to be damaged by the impingement of electrons or ions.

The emitter layer 12 may be made by any of various thick-film forming processes including screen printing, dipping, coating, electrophoresis, aerosol deposition, etc., or any of various thin-film forming processes including an ion beam process, sputtering, vacuum evaporation, ion plating, chemical vapor deposition (CVD), plating, etc. Particularly, it is preferable to form a powdery piezoelectric/electrostrictive material as the emitter layer 12 and impregnate the emitter layer 12 thus formed with glass of a low melting point or sol particles. According to this process, it is possible to form a film at a low temperature of 700° C. or lower or 600° C. or lower.

Preferably, the conductive particles 15 used to form the upper electrode 14 in the embodiments are of a scale-like powder, such as a scale-like graphite powder or a scale-like metal powder, or of a needle-like or rod-like powder such as carbon nanotube. A method of forming the upper electrode 14 is composed of, for example, the steps of dispersing (a dispersant is used as needed) the above-mentioned scale-like powder in an organic solvent (binder), such as ethyl cellulose, to thereby form a paste; forming a thick film of the paste on the upper surface of the emitter layer 12 by means of spin coating, screen printing, dipping, spraying, or a like process; and performing thermal processing on the formed thick film of the paste. In the case where a thick film is to be formed with employment of a paste viscosity of about in the range from 100,000 cp to 200,000 cp suited for the above-mentioned thick-film deposition, the film thickness after printing is preferably about in the range from 1 µm to 25 µm, more preferably about in the range from 3 µm to 15 µm. When the film is too thick, the size of the opening portion 20 becomes too small. When the film is too thin, electrical conduction within a single upper electrode 14 fails to be established. The thermal processing after formation of the thick film having a thickness falling within the above-mentioned range decomposes the binder, whereby only an electrode material remains in the film that is formed on the emitter layer 12 and is to become the upper electrode 14. At the same time, a plurality of the opening portions 20 are formed in the film: Thus, without employment of a special patterning process, such as a masking process, a plurality of the opening portions 20 and the overhanging portions 26 are formed in the upper electrode 14 as shown in, for example, FIG. 1. Preferably, sintering is performed in an atmosphere of inert gas (particularly when a carbon material is used), such as nitrogen. However, when the content of the conductive particles 15 contained in the paste is adjusted appropriately, sintering can be performed in the atmosphere or other atmosphere containing oxygen (including an atmosphere of reduced pressure).

The upper electrode 14 is formed as described above. More preferably, in formation of the upper electrode 14, the conductive fine particles 19 are added. The conductive fine particles 19 can be not only metal fine particles but also carbon fine particles, such as a spherical graphite powder or carbon black. In the step of adding the conductive fine particles 19, metal fine particles that have undergone classification so as to have a predetermined particle size are used as the conductive fine particles 19. Alternatively, a material that finally becomes conductive fine particles after undergoing sintering can be used as the conductive fine particles 19; for example, a resinate or the like may be used as the conductive fine particles 19.

When a carbon material is used as the conductive particles 15 (particularly in the atmosphere or other oxygen atmosphere), the thermal processing temperature for the upper electrode 14 is preferably 500 degrees or lower. In the case where the conductive fine particles 19 are added, the thermal processing temperature may be selected such that the conductive fine particles 19 do not aggregate or grow in excess of a predetermined particle size.

The lower electrode 16 is made of an electrically conductive material, e.g., a metal such as platinum, molybdenum, tungsten, or the like. Alternatively, the lower electrode 16 is made of an electric conductor which is resistant to a high-temperature oxidizing atmosphere, e.g., a metal, an alloy, a mixture of insulative ceramics and a metal, a mixture of insulative ceramics and an alloy, or the like. Preferably, the lower electrode 16 should be made of a precious metal having a high melting point such as platinum, iridium, palladium, rhodium, molybdenum, or the like, or a material chiefly composed of an alloy of silver and palladium, silver and platinum, platinum and palladium, or the like, or a cermet of platinum and ceramics. Further preferably, the lower electrode 16 should be made of platinum only or a material chiefly composed of a platinum-base alloy.

The lower electrode 16 may be made of carbon or a graphite-base material. Ceramics to be added to the electrode material should preferably have a proportion ranging from 5 to 30 volume %. The lower electrode 16 may be made of the same material as the upper electrode 14, as described above. Preferably, when the lower electrode 16 is to be formed of any of the above-mentioned metal and carbon materials, the aforementioned thick-film deposition process is used.

An integral structure can be imparted to the electron emitters 10A to 10C by performing thermal processing (sintering process) each time each of the emitter layer 12, the upper electrode 14, and the lower electrode 16 is formed. In the processes of sintering the upper electrode 14 and the lower electrode 16, using glass, a synthetic resin, or the like as a binder enhances adhesion of the upper and lower electrodes 14 and 16 to the emitter layer 12. The temperature of sintering process for integrating the emitter layer 12 and the lower electrode 16 is from 500° C. to 1,400° C., preferably from 1,000° C. to 1,400° C. Preferably, when the emitter layer 12 which is in form of a film is to be thermally processed, in order to avoid causing the composition of the emitter layer 12 to become unstable at high temperature, the sintering process is performed while controlling an atmosphere as well as an evaporation source for making the emitter layer 12.

Notably, sintering may be performed while the emitter layer 12 is covered with an appropriate material so as to avoid exposure of the surface of the emitter layer 12 to a sintering atmosphere.

EXAMPLES

Next, a method of forming the upper electrode 14 in the course of fabrication of an electron emitter according to the present invention will be described by way of example.

In the present examples, scale-like graphite particles are used as the conductive particles 15, and silver fine particles are added as the conductive fine particles 19.

The upper electrode 14 is formed by the steps of mixing scale-like graphite particles and a binder (a dispersant is used as needed); adding Ag resinate or Ag ink to the resultant mixture to thereby obtain a slurry; and applying the slurry to a dielectric material, which is to become the emitter layer 12, followed by thermal processing.

The preferred ratio between graphite and binder is graphite:binder=1:2 to 2:1. Preferably, a synthetic resin that decomposes at a temperature of 400° C. or lower is used as the binder. The silver fine particles are added such that the ratio by volume between graphite and silver is graphite:silver=5:5 to 9.5:0.5, preferably 7:3 to 9:1. In the case where Ag ink is used, the particle size of silver fine particles dispersed in ink is preferably 1 µm or less, more preferably 0.5 µm or less. When silver fine particles have a particle size greater than the above-mentioned range, the silver fine particles are subjected to pretreatment, such as pulverization or grinding.

Thermal processing is performed preferably at 450° C. or lower, more preferably about 400° C., so as to avoid the particle size of silver fine particles becoming greater than the above-mentioned range. In sintering, graphite particles are eroded through acceleration of oxidation of carbon by the presence of silver particles. Thus, when sintering is to be performed in an atmosphere containing oxygen, in some cases, the amount of graphite may be slightly increased as compared with the case of sintering in a nitrogen atmosphere.

Example 1

10 percent by weight scale-like graphite powder (trade name "SP20" (average particle size 15 µm, thickness about 2 µm), product of Nippon Graphite Industry Co., LTD.), 1 percent by weight dispersant (trade name "Disperbyk-108," product of BYK-Chemie, Germany), and 25 percent by weight binder (a mixture of ethyl cellulose and 2-ethylhexanol mixed at a ratio of 25:75) were mixed by use of the tri roll mill. When the graphite powder is aggregated, the graphite powder needs to be pretreated; specifically, grounded by use of a homogenizer.

Next, Ag resinate (trade name "XE109-4," product of Namics Corporation) was added to the above-prepared mixture such that the ratio by volume between graphite and silver becomes 9:1. The resultant mixture was mixed by use of the tri roll mill, thereby yielding a paste.

The thus-obtained paste was diluted with terpineol to a viscosity of about in the range from 100,000 cp to 200,000 cp. The thus-prepared paste was applied to the dielectric material to a thickness of 15 µm by screen printing. Subsequently, the thus-prepared dielectric material was treated in the heating furnace as follows: the dielectric material was subjected to a temperature rise to 400° C. in 15 minutes, sintered at 400° C. for about 2 hours in an atmosphere of the air (atmospheric pressure), and then gradually cooled within the furnace. As a result, an electrode was formed on the dielectric material to a thickness such that scale-like graphite lays in about several layers. It was confirmed from observation of the electrode through the electron microscope that opening portions each having an opening of several µm to 10 µm in size were formed.

Example 2

The electrode was formed in a manner similar to that of Example 1 except that scale-like graphite powder (trade name "KS25" (average particle size 25 µm, thickness about 2 µm), product of TIMCAL Ltd.) and Ag ink were used. The Ag ink was composed of a dispersion medium and silver fine particles, which were dispersed in the dispersion medium, and prepared by mixing 5 percent by weight NPS-J (trade name, product (average particle size: about 7 nm) of Harima Chemicals, Inc.), 10 percent by weight low-polymerization-degree polyvinyl butyral (trade name "S-LEC B BL-S," product of Sekisui Chemical Co., Ltd.), and 10 percent by weight terpineol. The mixing ratio was similar to that of Example 1. As in the case of Example 1, formation of opening portions each having an opening of several µm to 10 µm in size was confirmed.

The electron emitter according to the present invention is not limited to the above embodiments, but may assume various other configurations so long as the essentials of the present invention are not modified.

For example, the opening portion 20, whose inner edge serves as an electric field concentration point, may assume a shape other than those described above in the description of the embodiments. For example, the shape may be as shown in FIGS. 12 to 16.

Figure 16:
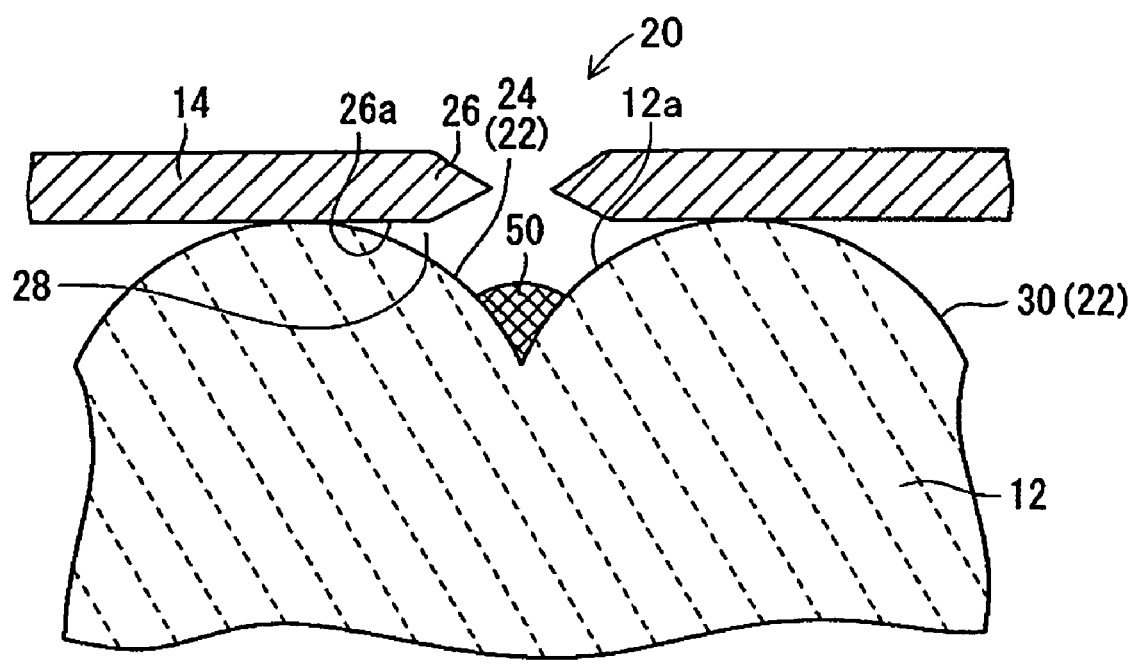
FIG. 16 is a sectional view showing an electron emitter according to a modification of any of the first to third embodiments, the modification employing a floating electrode.

As shown in FIG. 16, a floating electrode 50 may be present at a portion of the upper surface 12a of the emitter layer 12 that corresponds to the opening portion 20.

Figure 17:
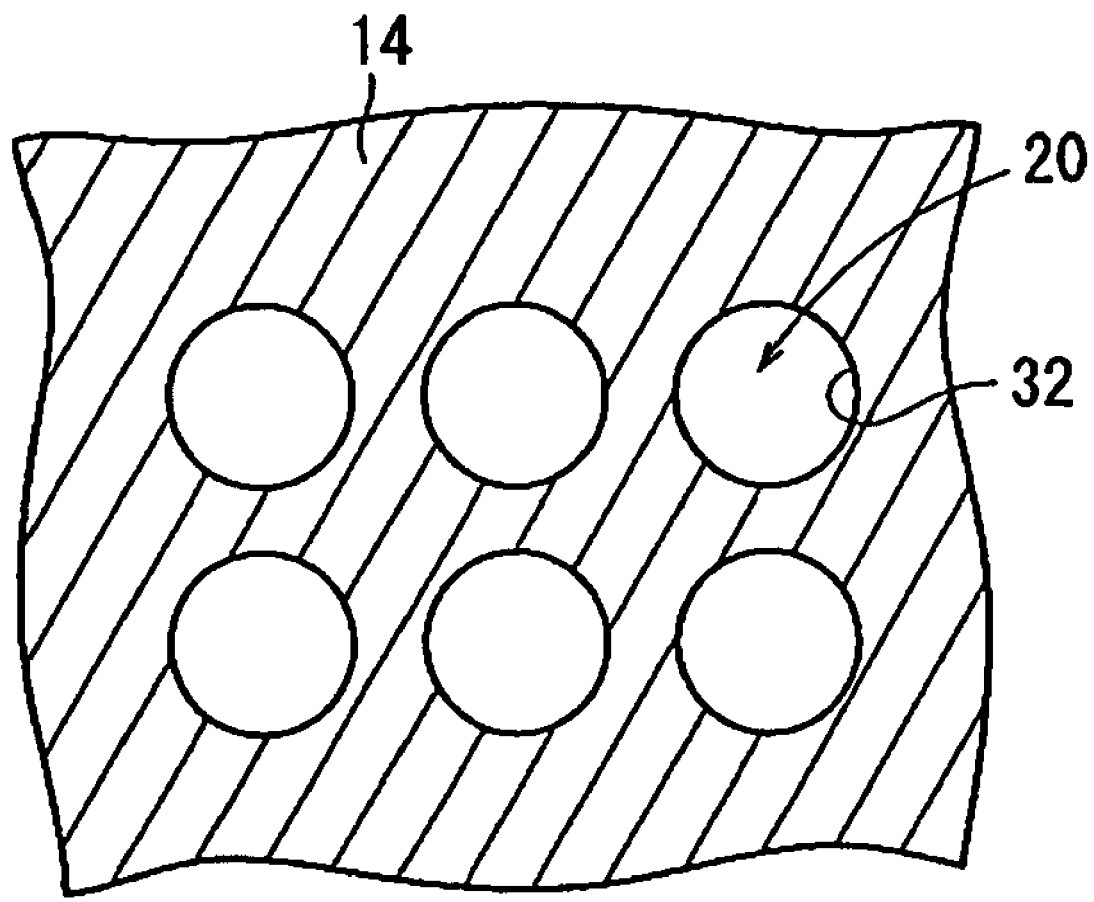
FIG. 17 is a plan view showing a modification of the shape of the opening portion in any of the electron emitters according to the first to third embodiments.
Figure 18:
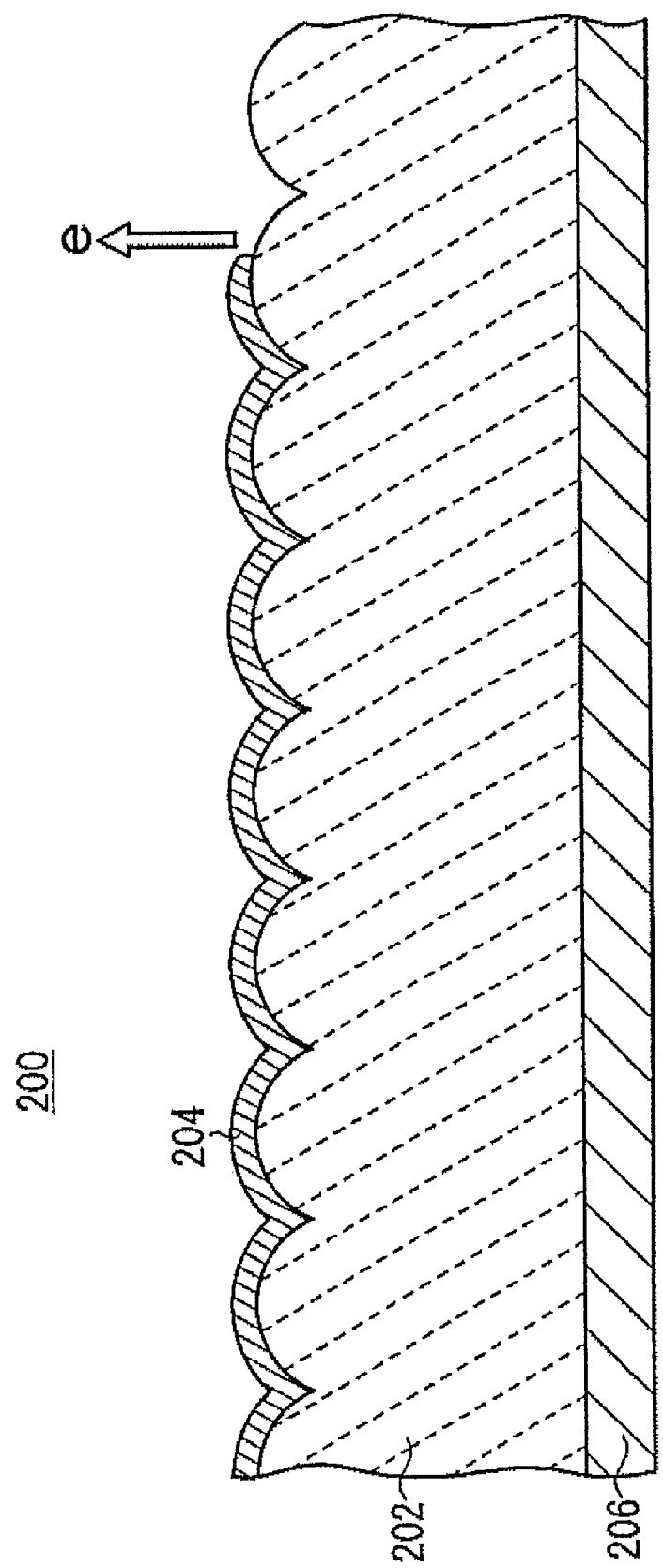
FIG. 18 is a fragmentary, sectional view showing a conventional electron emitter.

According to the fabricating method of the above embodiment, the opening portions 20 of the upper electrode 14 can be formed merely by forming a thick film while the viscosity and mixing ratio of the paste and the film thickness are controlled, without need to use masking or the like. However, as shown in FIG. 17, masking or the like may be used so as to form holes 32 having a certain shape. In this case, microscopically, the holes 32 each have a distorted shape because of influence of the shape of each of the conductive particles 15, thereby yielding an action or effect of increasing the number of sites from which electrons are supplied to the emitter layer 12.

What is claimed is:

1. An electron emitter comprising:
an emitter layer formed of a dielectric material;
a first electrode provided on or above a first surface of the emitter layer and having an opening portion with an opening formed therein; and
a second electrode provided on or below a second surface of the emitter layer opposite the first surface;
the emitter layer emitting electrons through the opening when a drive voltage is applied between the first electrode and the second electrode,
wherein the first electrode is configured and disposed such that a first portion of a surface of the opening portion facing the first surface of the emitter layer is apart from the first surface and a second portion of said surface of the opening portion of the first electrode is in contact with a portion of the first surface of the emitter layer, wherein the opening portion has an inner edge surrounding the opening, and has a shape which causes lines of electric force to concentrate at the inner edge.

2. An electron emitter comprising:
an emitter layer formed of a dielectric material;
a first electrode provided on or above a first surface of the emitter layer and having an opening portion with an opening formed therein; and
a second electrode provided on or above a second surface of the emitter layer opposite the first surface:
the emitter layer emitting electrons through the opening when a drive voltage is applied between the first electrode and the second electrode,
wherein the first electrode is configured and disposed such that a surface of the opening portion facing the first surface of the emitter layer is apart from the first surface, the opening portion has an inner edge surrounding the opening, and has a shape which causes lines of electric force to concentrate at the inner edge, and a portion of the first electrode is in contact with a portion of the first surface of the emitter layer, and
wherein the first electrode comprises graphite.

3. An electron emitter according to claim 2, wherein the first electrode further contains conductive fine particles.

4. An electron emitter according to claim 3, wherein the emitter layer also carries the conductive fine particles adhering to the first surface in an area facing to the opening portion.

5. An electron emitter according to claim 4, wherein the conductive fine particles are comprised of silver.

6. An electron emitter comprising:
an emitter layer formed of a dielectric material;
a first electrode provided on or above a first surface of the emitter layer and having an opening portion with an opening formed therein; and
a second electrode provided on or below a second surface of the emitter layer opposite the first surface;
the emitter layer emitting electrons through the opening when a drive voltage is applied between the first electrode and the second electrode,
wherein the first electrode is formed of an aggregation of conductive particles, each having an elongated cross section, which are disposed on or above the emitter layer such that the longitudinal direction of the cross section extends along the first surface, a first portion of a surface of the opening portion facing the first surface of the emitter layer is apart from the first surface and a second portion of said surface of the opening portion of the first electrode is in contact with a portion of the first surface of the emitter layer, wherein the opening portion is formed by peripheral edge portions of the conductive particles.

7. An electron emitter according to claim 6, wherein
the emitter layer is formed of a polycrystalline material,
the first electrode is composed of primary particles of the conductive particles and/or secondary particles formed through aggregation of the primary particles disposed on the first surface of the emitter, and
the primary particles or the secondary particles each have an elongated cross section, the length of which is greater than the average grain size of crystal grains of the polycrystalline material.

8. An electron emitter according to claim 7, wherein the first electrode is comprised of graphite.

9. An electron emitter according to claim 8, wherein the first electrode further contains conductive fine particles.

10. An electron emitter according to claim 9, wherein the emitter layer also carries the conductive fine particles adhering to the first surface in an area facing to the opening portion.

11. An electron emitter according to claim 10, wherein the conductive fine particles are comprised of silver.

12. An electron emitter according to claim 6, wherein the first electrode is comprised of graphite.

13. An electron emitter according to claim 12, wherein the first electrode further contains conductive fine particles.

14. An electron emitter according to claim 13, wherein the emitter layer also carries the conductive fine particles adhering to the first surface in an area facing to the opening portion.

15. An electron emitter according to claim 14, wherein the conductive fine particles are comprised of silver.

16. A method of fabricating an electron emitter which comprises an emitter layer formed of a dielectric material, a first electrode provided on or above a first surface of the emitter layer and having an opening portion with an opening formed therein, and a second electrode provided on or below a second surface of the emitter layer opposite the first surface, the emitter layer emitting electrons through the opening when a drive voltage is applied between the first electrode and the second electrode, the method comprising:
preparing a paste composed of a dispersion medium, and conductive particles dispersed in the dispersion medium and having an elongated cross section;
forming a film of the paste on or above the first surface of the emitter layer;
sintering the film to thereby form the first electrode,
wherein the first electrode is configured and disposed such that a first portion of a surface of the opening portion facing the first surface of the emitter layer is apart from the first surface, and a second portion of said surface of the opening portion of the first electrode is in contact with a portion of the first surface of the emitter layer.

17. A method of fabricating an electron emitter according to claim 16, wherein
the step of preparing the paste includes dispersing conductive fine particles in the dispersion medium.

* * * * *

UNITED STATES PATENT AND TRADEMARK OFFICE
CERTIFICATE OF CORRECTION

PATENT NO. : 7,528,539 B2
APPLICATION NO. : 11/145004
DATED : May 5, 2009
INVENTOR(S) : Iwao Ohwada et al.

It is certified that error appears in the above-identified patent and that said Letters Patent is hereby corrected as shown below:

Title Page;

Item (56), References Cited, FOREIGN PATENT DOCUMENTS, *please add*:

| | | |
|---|---|---|
| JP | 1-311533 A | 12/1989 |
| JP | 7-147131 A | 6/1995 |
| JP | 2000-285801 A | 10/2000 |
| JP | 46-20944 | 6/1971 |
| JP | 44-26125 | 11/1969 |
| JP | 11-185600 | 7/1999 |
| JP | 10-27539 A | 1/1998 |
| JP | 11-288249 A | 10/1999 |
| JP | 63-150837 A | 6/1988 |
| JP | 09-090882 A | 4/1997 |
| JP | 59-208587 | 11/1984 |
| JP | 3160213 B2 | 2/2001 |
| EP | 0 953 958 A2 | 11/1999 |
| JP | 2000-310970 A | 11/2000 |
| WO | 02/052600 A1 | 7/2002 |
| DE | 3833604 | 04/1990 |
| FR | 2639151 | 05/1990 |
| EP | 428853 | 05/1991 |
| FR | 2675306 | 10/1992 |
| FR | 2789221 | 08/2000 |
| FR | 2789223 | 08/2000 |
| DE | 10057072 | 05/2001 |
| EP | 0 353 632 | 02/1990 |

Item (56), References Cited, OTHER PUBLICATIONS, *please add*:

"Pulsed Electron Source Using a Ferroelectric Cathode," Tokyo Institute of Technology, Vol. 68, No. 5, 7 January 1999, pp. 546-550.

Puchkarev, Victor F. and Mesyats, Gennady A., "On the Mechanism of Emission from the Ferroelectric Ceramic Cathode," Journal of Applied Physics, Vol. 78, No. 9, 1 November 1995, pp. 5633-5637.

UNITED STATES PATENT AND TRADEMARK OFFICE
CERTIFICATE OF CORRECTION

PATENT NO. : 7,528,539 B2
APPLICATION NO. : 11/145004
DATED : May 5, 2009
INVENTOR(S) : Iwao Ohwada et al.

It is certified that error appears in the above-identified patent and that said Letters Patent is hereby corrected as shown below:

Riege, H., "Electron Emission from Ferroelectrics - a Review," Nucl. Instr. and Meth. A340, 1994, pp. 80-89.

Masatoshi Miyake et al., "Electron Emission from Ferroelectric Cathodes Excited by Pulsed Voltage," Tokyo Institute of Technology, Vol. 119, No. 5, 1999 pp. 622-627.

G. Benedek et al., "Electron Emission From Ferroelectric/Antiferroelectric Cathodes Excited by Short High-Voltage Pulses", Journal Applied Physics, Vol. 81, No. 3, 1 February 1997, pages 1396-1403.

Gundel, H. et al., "Low Pressure Hollow Cathode Switch Triggered by a Pulsed Electron Beam Emitted From Ferroelectrics", Applied Physics Letter, American Institute of Physics, New York, US Vol. 54, No. 21, 22 May 1989, pages 2071-2073.

Gundel, H. et al., "Time-Dependent Electron Emission From Ferroelectrics by External Pulsed Electric Fields", Journal of Applied Physics, American Institute of Physics, New York, US Vol. 69, No. 2, 15 January 1991, pages 975-982.

Signed and Sealed this

Twenty-fifth Day of August, 2009

David J. Kappos
*Director of the United States Patent and Trademark Office*